US006639634B1

(12) United States Patent
Zhang et al.

(10) Patent No.: US 6,639,634 B1
(45) Date of Patent: Oct. 28, 2003

(54) REPAIRABLE LCD AND ITS MANUFACTURE

(75) Inventors: Hongyong Zhang, Kawasaki (JP); Keizo Morita, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/491,342

(22) Filed: Jan. 26, 2000

(30) Foreign Application Priority Data

Mar. 19, 1999 (JP) ............................. 11-076800

(51) Int. Cl.⁷ ..................... G02F 1/1333; G02F 1/1337
(52) U.S. Cl. ............................ 349/54; 349/192
(58) Field of Search .................. 349/54, 192, 139, 349/55; 257/59; 395/93, 92

(56) References Cited

U.S. PATENT DOCUMENTS

| | | | | |
|---|---|---|---|---|
| 5,734,450 A | * | 3/1998 | Irie et al. ..................... | 349/39 |
| 6,111,620 A | * | 8/2000 | Nishiki et al. ................ | 349/54 |
| 6,111,621 A | * | 8/2000 | Kim et al. .................... | 349/54 |
| 6,191,832 B1 | * | 2/2001 | Nakakura ..................... | 349/54 |

\* cited by examiner

*Primary Examiner*—Toan Ton
(74) *Attorney, Agent, or Firm*—Greer, Burns & Crain, Ltd.

(57) ABSTRACT

A liquid crystal display device has: a first substrate having an insulating surface; a display unit disposed in a central area of the first substrate and including a plurality of pixels disposed in a matrix shape, a plurality of scan lines for activating pixels disposed in a row direction, and a plurality of signal lines each for transferring video data to an activated pixel among pixels disposed in a column direction; a scan line driver circuit formed in a first row direction side area of a peripheral area of the first substrate outside of the display unit, the scan line driver circuit generating a signal for driving the scan lines; a signal line driver circuit formed in a first column direction side area of the peripheral area of the first substrate, the signal line driver circuit generating a signal for driving the signal lines; and a repair circuit formed in a partial area of the peripheral area of the first substrate, the repair circuit having substantially a same structure as a portion of the scan line driver circuit and the signal line driver circuit. A line defect of the display device can be repaired easily.

18 Claims, 22 Drawing Sheets

REPAIRABLE LCD AND ITS MANUFACTURE

This application is based on Japanese Patent Application HEI 11-76800, filed on Mar. 19, 1999, the entire contents of which are incorporated herein by reference.

BACKGROUND OF THE INVENTION a) Field of the Invention

The present invention relates to a liquid crystal display device and its manufacture method, and more particularly to an active matrix type liquid crystal display device and its manufacture method.

b) Description of the Related Art

An active matrix type liquid crystal display device has a number of pixels disposed in a matrix shape in a display area. Each pixel includes a switching element and a pixel electrode. As a switching element, a thin film transistor (TFT) made of amorphous silicon is used. Scan lines and signal lines crossing each other are disposed in the display area to drive TFT of each pixel, the scan lines being connected to the gate electrodes of TFTs and the signal lines being connected to source electrodes of TFTS (ones of current electrodes which are herein called source electrodes as expedient).

A liquid crystal display device includes a TFT substrate, a common electrode substrate disposed opposing the TFT substrate, and a liquid crystal layer sandwiched between both the substrates. The common electrode substrate has a single common electrode formed in the whole display area. For color display, a color filter is formed on one of the substrates.

In a liquid crystal display device having an amorphous TFT at each pixel, a control circuit for scan lines and signal lines is disposed on a printed circuit board different from the TFT substrate, and connected to the TFT substrate by tape automated bonding (TAB). A control circuit for ICs and the like is also formed on a TAB film.

Although some point defects of a liquid crystal display device are permitted, line defects are not permitted. Therefore, even if a single scan line or single signal line is disconnected, the liquid crystal display device is considered as a defective product.

In order to repair such a line defect, repair operational (OP) amplifiers are connected in an external circuit. Each operational amplifier is structured to be connectable to a selected scan line or signal line, on the side opposite to the end of the scan line or signal line connected to a control circuit. For example, if one scan line is disconnected at its intermediate position, a signal from a scan line driver circuit can be transferred only to the disconnection point. By supplying an output of the OP amplifier from the other end of the same scan line, the disconnected scan line can be driven by the same signal. A disconnection of a signal line can be repaired in a similar manner.

In repairing a defect, hot wiring lines such as scan lines and signal lines are disposed crossing repair wiring lines, with an insulating film being interposed therebetween, and a laser beam is applied to a cross point to short-circuit the hot and repair wiring lines.

With this repair method, one external OP amplifier is required in order to repair one defect of a wiring line. As a number of OP amplifiers are connected, not only the manufacture cost rises but also the area to be occupied by OP amplifiers is required, so that the restrictions on design increase.

Recently, techniques have been developed by which an amorphous silicon film is converted into a polysilicon film by applying a laser beam such as XeCl laser and KrF laser to the amorphous silicon film formed on a glass substrate. If a polysilicon film is formed on a glass substrate, a high performance TFT can be formed.

At the same time when such a high performance TFT is formed, a peripheral circuit as well as the display unit can be formed on a glass substrate. Even in the case wherein the display unit with an integrated peripheral circuit is formed on a glass substrate, a defect repair by using OP amplifiers in an external IC may be performed. However, the electrical characteristics and temperature characteristics are greatly different between MOSFETs in OP amplifiers using single crystal silicon and polycrystalline TFT on a glass substrate. It is therefore difficult to repair a line defect to the degree that a substantial problem will not occur.

If upper and lower wiring layers with an interposed insulating film are to be short-circuited through laser radiation, the radiation energy sufficient for forming a good short-circuit is relatively high, and its margin is relatively narrow. Therefore, a repair success rate is low and latent cause of defects may be generated.

As described above, various kinds of problems are associated with a defect repair for an active matrix type liquid crystal display device.

SUMMARY OF THE INVENTION

It is an object of the present invention to provide a liquid crystal display device capable of easily repairing a defect.

It is another object of the present invention to provide an active matrix type liquid crystal display device with an integrated peripheral circuit, capable of easily repairing a defect which results in a line defect.

It is still another object of the present invention to provide a manufacture method for an active matrix type liquid crystal display device with an integrated peripheral circuit, capable of easily repairing a defect.

According to one aspect of the present invention, there is provided a liquid crystal display device, comprising: a first substrate having an insulating surface; a display unit disposed in a central area of the first substrate and including a plurality of pixels disposed in a matrix shape, a plurality of scan lines for activating pixels disposed in a row direction, and a plurality of signal lines each for transferring video data to an activated pixel among pixels disposed in a column direction; a scan line driver circuit formed in a first row direction side area of a peripheral area of the first substrate outside of the display unit, the scan line driver circuit generating a signal for driving the scan lines; a signal line driver circuit formed in a first column direction side area of the peripheral area of the first substrate, the signal line driver circuit generating a signal for driving the signal lines; and a repair circuit formed in a partial area of the peripheral area of the first substrate, the repair circuit having substantially a same structure as a portion of the scan line driver circuit and the signal line driver circuit.

According to another aspect of the present invention, there is provided a method of manufacturing a liquid crystal display device, comprising: a preparing step of preparing a TFT substrate having: a first substrate having an insulating surface; a display unit disposed in a central area of the first substrate and including a plurality of pixels disposed in a matrix shape, a plurality of scan lines for activating pixels disposed in a row direction, and a plurality of signal lines each for transferring video data to an activated pixel among pixels disposed in a column direction; a scan line driver circuit formed in a first row direction side area of a peripheral area of the first substrate outside of the display unit, the scan line driver circuit generating a signal for driving the scan lines; a signal line driver circuit formed in a first column direction side area of the peripheral area of the first substrate, the signal line driver circuit generating a signal for driving the signal lines; and a repair circuit formed in a partial area of the peripheral area of the first substrate, the repair circuit having substantially a same structure as a portion of the scan line driver circuit and the signal line driver circuit; and a repairing step of activating the repair circuit by using the repair line when a defect is found, to repair the defect.

DETAILED DESCRIPTION OF THE PREFERRED EMBODIMENTS

FIGS. 1A to 1G show the structures of an active matrix TFT substrate with integrated peripheral circuits and an active matrix TFT substrate with integrated peripheral circuits and integrated repair circuits.

Figure 1A:
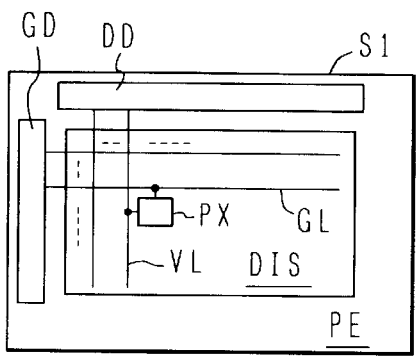
FIGS. 1A to 1G are plan views, block diagrams and an equivalent circuit diagram, briefly illustrating the structure of liquid crystal display devices according to an embodiment of the invention.

FIG. 1A shows an example of the structure of an active matrix substrate with integrated peripheral circuits. A display area DIS is defined in the central area of a glass substrate S1. A peripheral area PE is left in the peripheral area of the display area DIS. A peripheral circuit is formed integrally in a partial area of the peripheral area PE. In this structure shown in FIG. 1A, a data signal line driver circuit DD is disposed along one longer side of the display area, and a scan line driver circuit GD is disposed along a shorter side.

In the display area DIS, a plurality of video signal lines VL are disposed in the vertical direction, and a plurality of scan lines GL are disposed in the horizontal direction, crossing the video signal lines VL. A pixel PX is connected at each cross point between the signal line VL and scan line GL.

In the structure shown in FIG. 1A, no circuit is formed in the right peripheral area and in the lower peripheral area. These peripheral areas cannot be omitted because of requirements by assembly and the like of the liquid crystal display device.

Figure 1B:
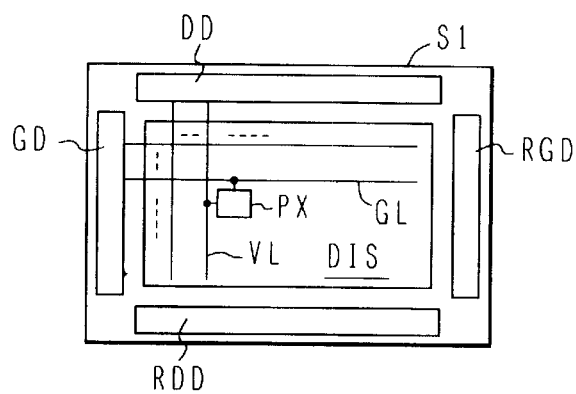

FIG. 1B shows repair circuits added to the active matrix substrate shown in FIG. 1A. In the right area of the peripheral area PE, a repair scan line driver circuit RGD is formed having the equivalent circuit structure to that of the scan line driver circuit GD, and in the lower area of the peripheral area PE, a repair signal line driver circuit RDD is formed having the equivalent circuit structure to that of the signal line driver circuit DD. The term "equivalent circuit structure" used herein is intended to include the structure considered as having the same circuit function by allowing manufacture process variation and the structure having the different number of basic units if it contains a plurality of basic units. The repair circuits having the equivalent circuit structure to those of the scan line and signal line driver circuits can be manufactured without adding special manufacture processes.

Figure 1C:
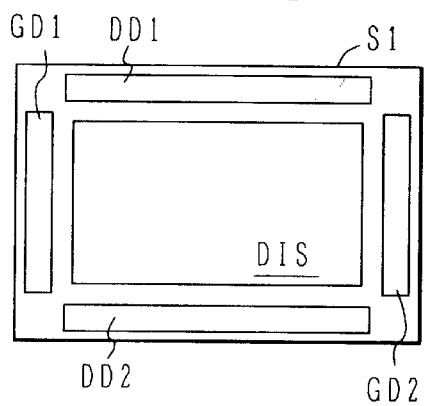

FIG. 1C shows another example of the active matrix substrate. A display area DIS is defined in the central area of a glass substrate S1. A pair of signal line driver circuits DD1 and DD2 are formed in the area along the longer sides of the peripheral area. For example, the odd number signal line is driven by the upper signal line driver circuit DD1, and the even number signal line is driven by the lower signal line driver circuit DD2.

A pair of scan line driver circuits GD1 and GD2 are formed in a pair of areas along the shorter sides of the peripheral area of the glass substrate. The pair of scan line driver circuits GD1 and GD2 drive the same signal line from opposite ends thereof. This structure has a smaller empty peripheral area. Therefore, there is no area margin for forming repair circuits having the same structure as those of the signal line driver circuits DD1 and DD2 and scan line driver circuits GD1 and GD2.

Figure 1D:
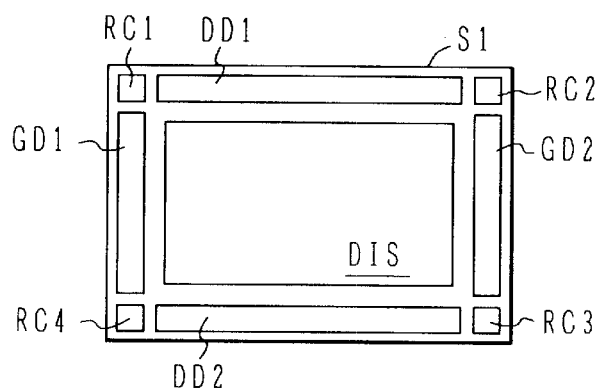

FIG. 1D shows an example of the structure having repair circuits added to the structure shown in FIG. 1C. Repair circuits RC1 to RC4 are formed in corner areas of the peripheral area. For example, of the repair circuits RC1 to RC4, two circuits have the same structure as that of a portion of the signal line driver circuits DD1 and DD2, and the other two circuits have the same structure as that of a portion of the scan line driver circuits GD1 and GD2.

If a portion of the peripheral circuit becomes defective, the wiring connection is changed to replace this detective portion by a portion of the repair circuits RC1 to RC4. How the wiring is formed will be later detailed.

Figure 1E:
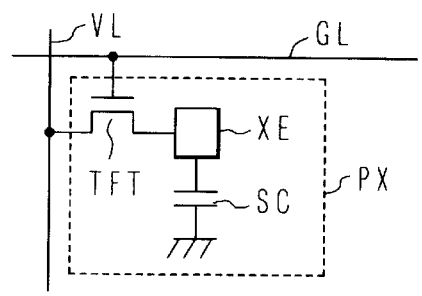

FIG. 1E is an equivalent circuit diagram showing an example of the structure of one pixel. A pixel PX includes a switching thin film transistor TFT, a pixel electrode XE, and a storage capacitor SC. The source electrode of TFT is connected to the signal line VL, the gate electrode is connected to the scan line GL, and the drain electrode is connected to the pixel electrode XE. Of course, the name of source and drain can be exchanged. The pixel electrode XE also serves as one of the electrodes of the storage capacitor SC. The other of the electrodes of the storage capacitor SC is made of a conductor disposed facing the pixel electrode via an insulating film. These other electrodes of the storage capacitor SC are formed, for example, extending in the row or column direction, and applied with the same voltage.

A defect in TFT in the display area becomes a point defect. If the signal line VL is disconnected, a line defect is generated along the signal line from the disconnection point toward the direction away from the signal line driver circuit DD. In the structure shown in FIG. 1A, if a scan line GL is disconnected, a line defect is generated along the scan line in a downstream area from the disconnection point. Of these point and line defects, the line defect is necessary to be repaired by all means.

Figure 1F:
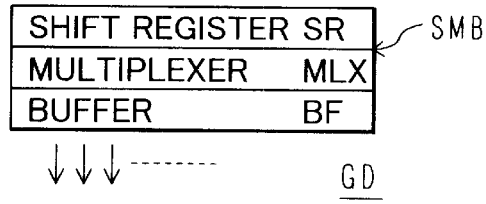

FIG. 1F is a schematic diagram showing the structure of the scan line driver circuit GD. The scan line driver circuit GD includes a shift register SR, a multiplexer MLX, and a buffer circuit BF for buffering the output signal of the multiplexer MLX. The scan line driver circuit GD sequentially generates and outputs a signal to a plurality of scan lines, this signal being used for sequentially shifting a scan line to be selected. The shift register, multiplexer and buffer circuit are collectively represented by SMB.

Figure 1G:
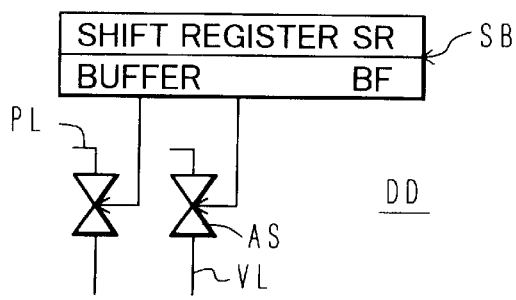

FIG. 1G is a schematic diagram showing the structure of the signal line driver circuit DD. The signal line driver circuit DD includes a shift register SR, a buffer circuit BF, and analog switches AS to be turned on/off by outputs of the buffer circuit. The shift register SF and buffer circuit BF are collectively represented by SB.

The analog switch AS has a function of transferring a video signal supplied from a video data line PL selectively to a corresponding signal line VL. The signal line driver circuit DD operates at faster speed than the scan line driver circuit GD, so that defects can be generated relatively easily. The analog switch AS in particular has a long channel width, so that detects are likely to be generated.

Figure 2A:
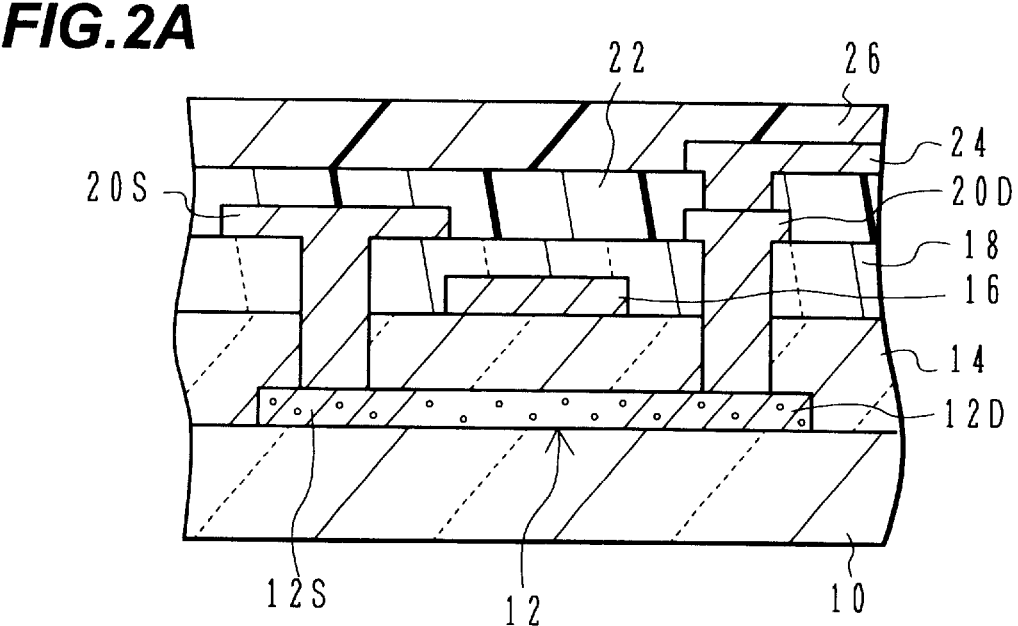
FIGS. 2A to 2C are a cross sectional view and plan views briefly illustrating the pixel structure in a display area of the liquid crystal display device shown in FIGS. 1A to 1G.
Figure 2B:
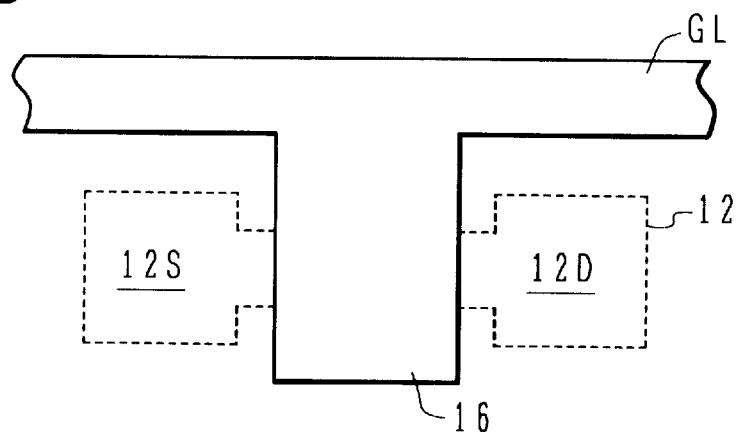
Figure 2C:
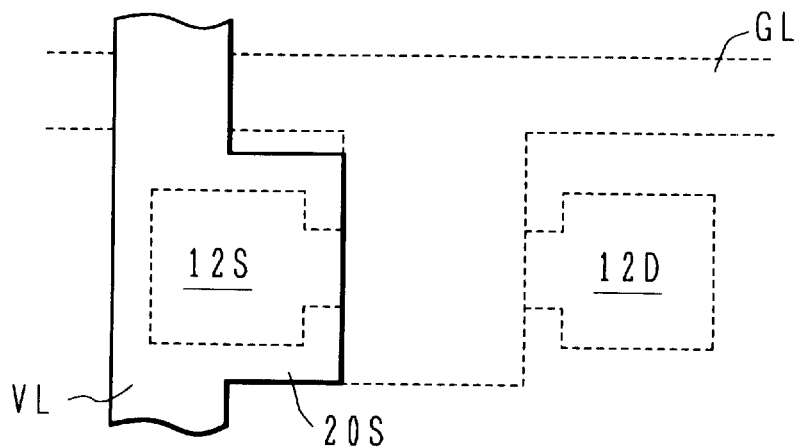

FIGS. 2A to 2C show details of an example of the structure of TFT in the display area. FIG. 2A is a cross sectional view and FIGS. 2B and 2C are plan views after the scan line GL and signal line VL are formed.

As shown in FIG. 2A, on the surface of a glass substrate 10, an island polysilicon layer 12 is formed after an $SiO_2$ film is deposited when necessary on the glass substrate 10. The island polysilicon layer is formed by first depositing an amorphous silicon layer, crystallizing it through leaser annealing by applying a laser beam such as XeCl layer and KrF laser, and thereafter pattering the crystallized silicon layer. For example, the polysilicon layer 12 has a thickness of 40 nm.

As shown in FIG. 2B, the shape of the polysilicon layer 12 has wide regions 12S and 12D on opposite ends and a stripe region connecting the wide regions 12S and 12D.

A gate insulating film 14 made of oxide or nitride is formed covering the polysilicon layer 12. For example, an $SiO_2$ film having a thickness of 200 nm is formed. On the gate insulating film 14, a gate electrode 16 is formed. For example, the gate electrode is made of an Al—Nd alloy layer having a thickness of 300 nm.

As shown in FIG. 2B, the gate electrode 16 is formed by the same layer as the scan line GL, continuously with it. Before the process shown in FIG. 2B is completed, desired impurities are doped in the opposite wide regions of the polysilicon layer 12.

An interlayer insulating film 18 is formed covering the gate electrode 16. For example, an $SiN_x$ film having a thickness of 50 nm is formed. Contact holes are formed through the interlayer insulating film 18 and gate insulating film 14, reaching the source region 12S and drain-region 12D of the polysilicon layer 12. Source and drain electrodes 20S and 20D filled in the contact holes are formed. For example, this electrode layer is made of a stacked-layer of a Ti layer 80 nm in thickness, an Al layer 250 nm in thickness and a Ti layer 150 nm in thickness.

FIG. 2C shows a plan shape of the source electrode 20S. The source electrode 20S is formed by the same layer as a signal line VL, continuously with it. The drain electrode above the drain region is not shown in FIG. 2C. Thereafter, a planarizing film 22 of resin, spin-on-glass (SOG) or the like is formed covering the source and drain electrodes 20S and 20D. A contact hole is formed through the planarizing film 22, reaching the drain electrode 20D.

A pixel electrode 24 of indium-tin-oxide (ITO) or the like is formed, while being filled in this contact hole. If a reflection type liquid crystal display device is to be formed, a metal electrode having a high reflectivity may be used in place of ITO. After the pixel electrode 24 is formed, an orientation film 26 of polyimide or the like is formed on the surface of the substrate.

The gate electrode 16 and scan line GL are made of, for example, Al—Nd alloy. The source electrode 20S (and drain electrode 20D) and signal line VL are made of, for example, a stacked-layer of Ti/Al/Ti. Since these two types of metal layers GL and VL are formed at different levels (layers), they can be used as upper and lower wiring layers in the peripheral circuit area. Since both the wiring layers include a main component Al having a low melting point, they can be relatively easily melted and a short circuit can be formed at a cross point between them when a laser beam is applied. A disconnection of the scan line GL or signal line VL in the structure of the display area shown in FIGS. 2A to 2C may cause a line defect.

A plurality of analog switches AS are connected to the output terminals of the signal line driver circuit as shown in FIG. 1G.

Figure 3A:
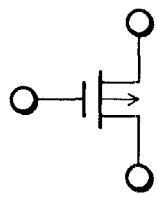
FIGS. 3A to 3D are equivalent circuit diagrams and a plan view illustrating the structure of an analog switch used by the liquid crystal display device shown in FIGS. 1A to 1G.
Figure 3B:
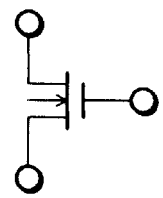
Figure 3C:
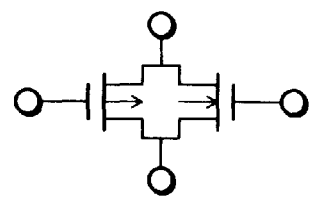

FIGS. 3A to 3D show the structure of an analog switch. An analog switch may have a p-channel MOS transistor structure as shown in FIG. 3A, an n-channel MOS transistor structure as shown in FIG. 3B, or a CMOS transistor structure as shown in FIG. 3C. Of these structures, the structure shown in FIG. 3C is most preferable.

Figure 3D:
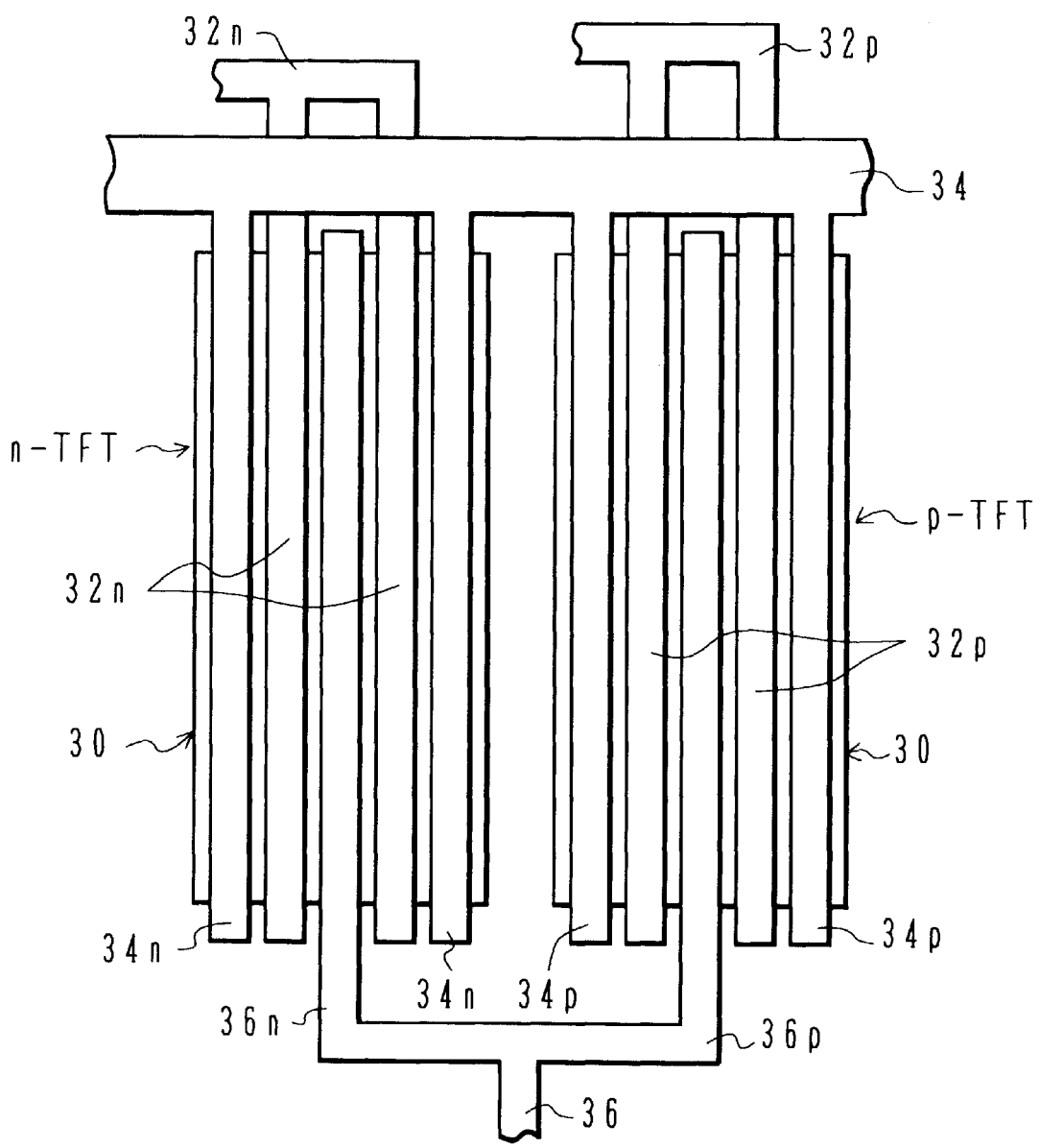

FIG. 3D shows an example of the structure of a CMOS type analog switch shown in FIG. 3C. A pair of island semiconductor layers 30 is formed, and over these layers, source electrodes, gate electrodes and drain electrodes are formed. Video data is transferred from a common source electrode 34 to four source electrodes 34n and 34p disposed vertically. The right and left semiconductor layers are used for forming n- and p-channel TFTs, and have the similar structure. In each TFT, the source electrodes 34n and 34p are disposed on opposite sides, drain electrodes 36n and 36p are disposed in central areas, and gate electrodes 32n and 32p are disposed between the source and drain electrodes.

Although polysilicon has been improved to have a mobility considerably higher than amorphous silicon, its mobility is still small as compared to single crystal silicon. In order to obtain a sufficiently low on-resistance, each TFT is structured so that it can have a wide channel width and that carriers can be supplied at the same time from both the opposite source regions to the central drain regions. Since each electrode disposed at a narrow space pitch is long and the number of electrodes is large, there is a high possibility that an analog switch has a defect.

Figure 4:
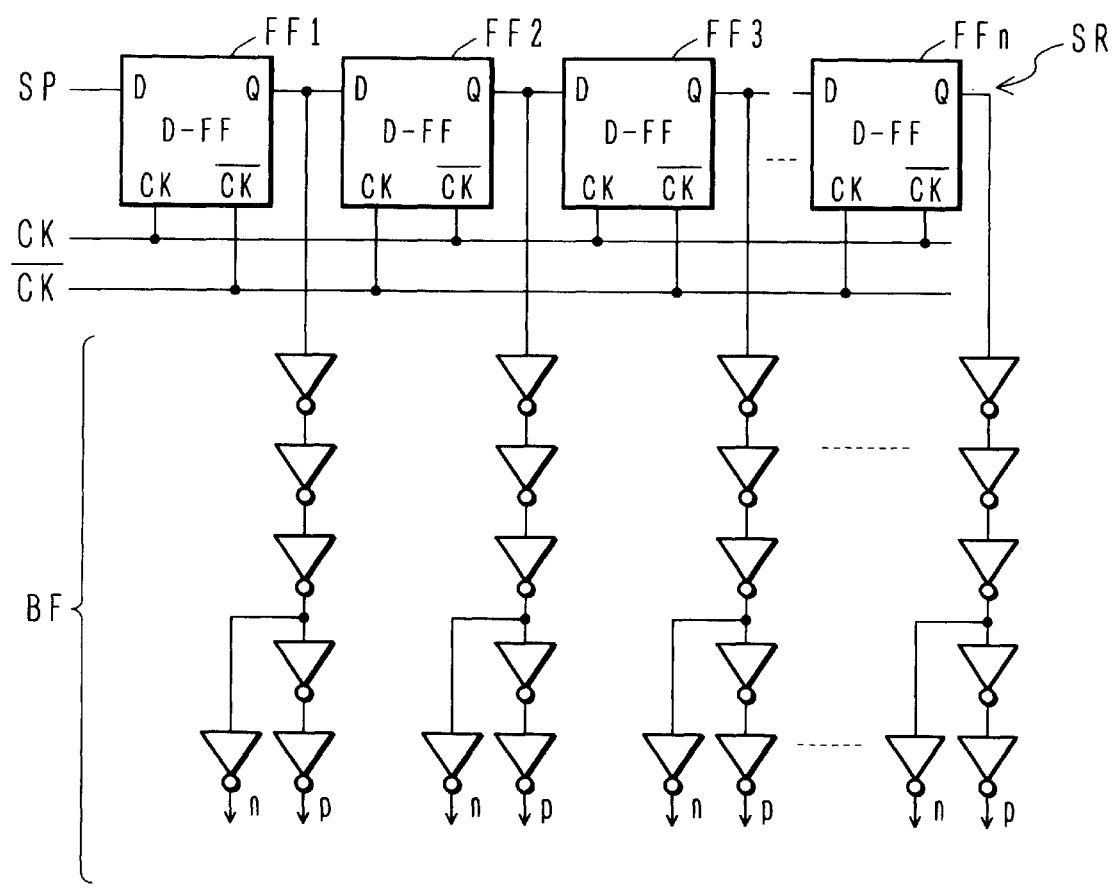
FIG. 4 is a block diagram briefly illustrating the structure of a signal line driver circuit of the liquid crystal display device shown in FIGS. 1A to 1G.

FIG. 4 is an equivalent circuit diagram showing the structure of the signal line driver circuit with the analog switches being omitted. Flip-flop circuits FF1 to FFn of n stages are serially connected. An output of the flip-flop FF at the preceding stage is supplied to an input of the flip-flop FF at the succeeding stage to constitute a shift register. Outputs of the shift register are supplied to buffer circuit BF including parallel branches each having a plurality of serially connected inverters. Two outputs of a CMOS type analog switch are generated by forming a branch wiring line at the intermediate node of each parallel branch of the buffer circuit BF.

Figure 5:
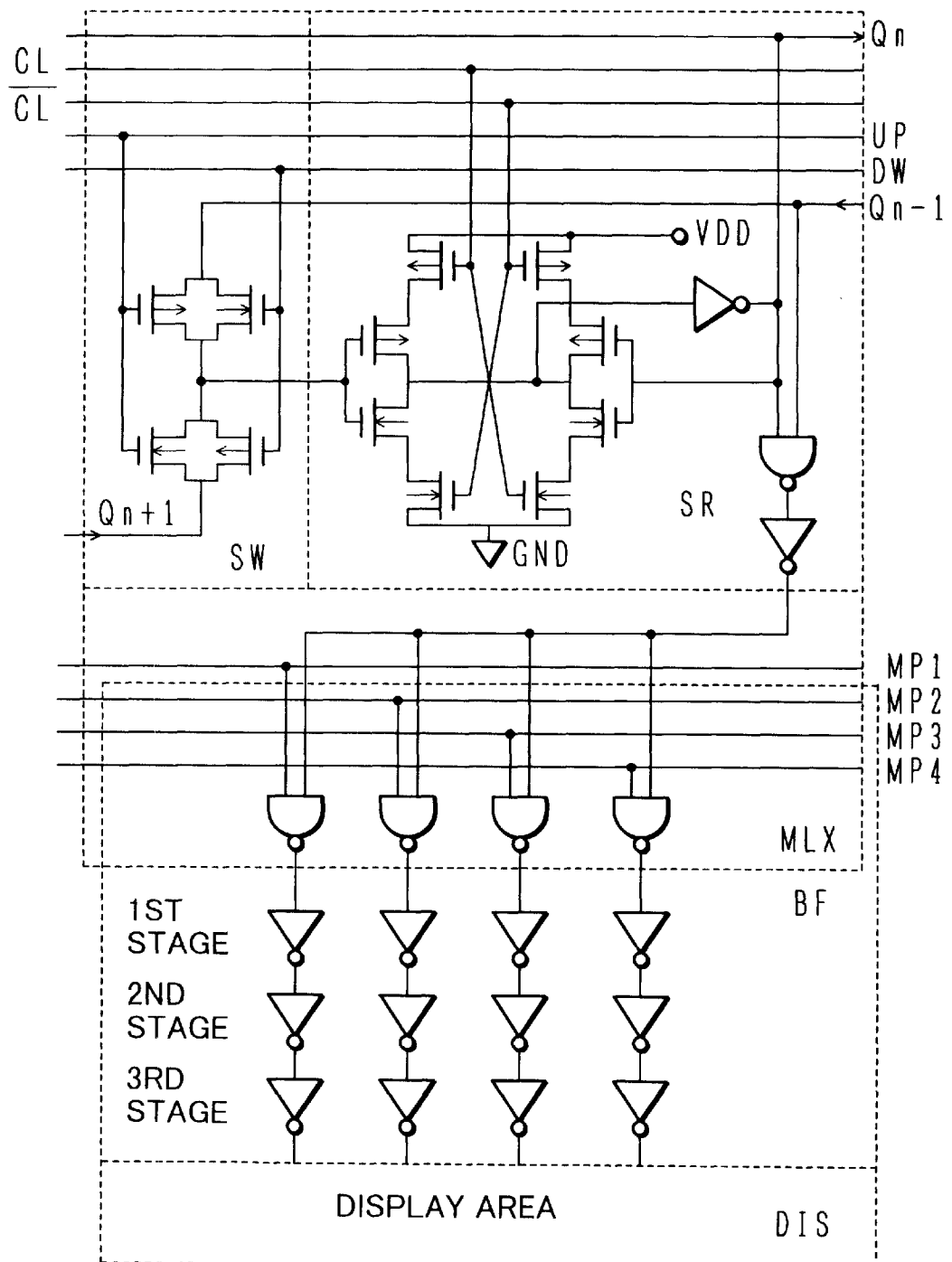
FIG. 5 is an equivalent circuit diagram showing the structure of a scan line driver circuit of the liquid crystal display device shown in FIGS. 1A to 1G.

FIG. 5 is an equivalent circuit briefly showing the structure of the scan line driver circuit. In the upper portion of FIG. 5, a two-way switch SW and one stage shift register SR are shown. An output of the shift register SR is supplied to the shift register at the next stage. At the multiplexer MLX, a logical AND is calculated between the output of the shift register SR and four multiplex signals MP1 to MP4 to generate four scan signals. These four scan signals are supplied via buffer circuits BF to the scan lines in the display area DIS. If the number of scan lines is 600, shift registers of 150 stages are provided.

Figure 6A:
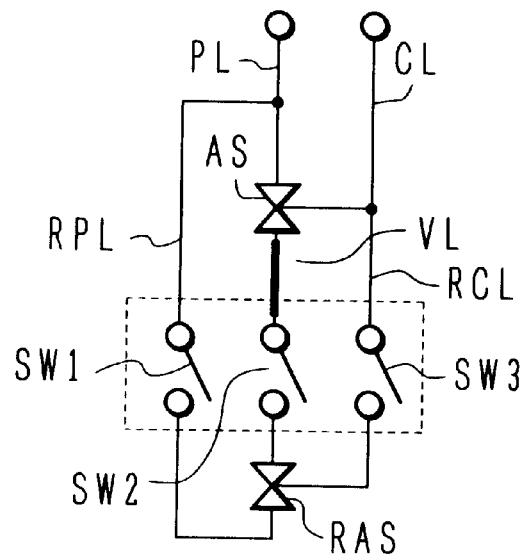
FIGS. 6A to 6C are equivalent circuit diagrams briefly illustrating how a defective analog switch is repaired.
Figure 6B:
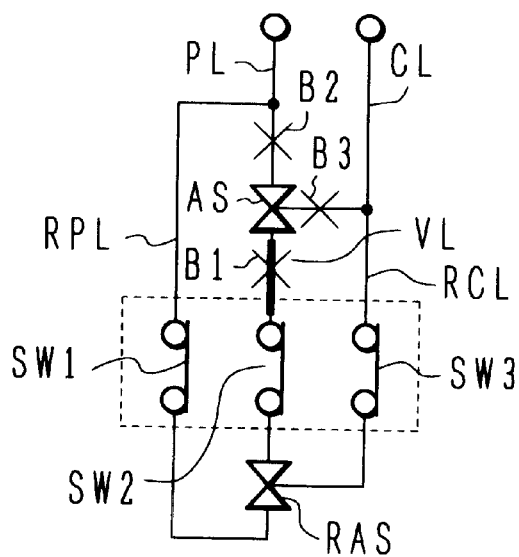
Figure 6C:
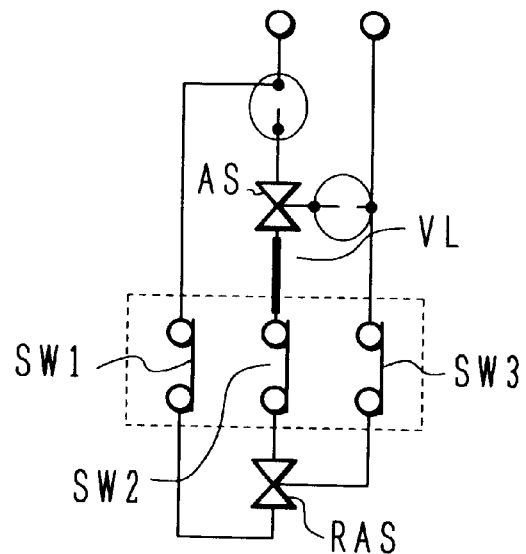

FIGS. 6A to 6C illustrate defect repair methods for the analog switch and signal line VL. Consider, for example, that as shown in FIG. 1A the circuit arrangement of the active matrix substrate has the signal line driver circuit DD formed in a partial area of the peripheral area adjacent to the display area DIS.

As shown in FIG. 6A, an analog switch AS is disposed between a video data line PL and a video signal line VL, and the control electrode of this analog switch AS is controlled by a control line CL. A plurality of analog switches having such a structure is disposed in parallel in the horizontal direction.

In a repair circuit, a repair analog switch RAS is disposed connectable via a switch SW2 to the other end of the signal line VL, the other current electrode of the repair analog switch RAS is made connectable to the data line PL via a repair data line RPL and a switch SW1, and the control electrode of the repair analog switch RAS is made connectable to the control line CL via a repair control line RCL and a switch SW3.

The switches SW1, SW2 and SW3 are normally off, and if the analog switch AS and signal line VL are normal, the repair analog switch RAS is electrically separated.

It is assumed that the signal line VL is disconnected at an intermediate position B1 thereof as shown in FIG. 6B. Video data cannot be transferred to the pixels downstream of the disconnection point B1 of the signal line VL. In this case, the switches SW1, SW2 and SW3 are closed to activate the repair analog switch RAS so that the same video data can be transferred to the signal line VL from the downstream side.

Similarly, if the input wiring line to the analog switch AS is disconnected at a position B2 or if the control line B3 is disconnected at a position B3, a similar repair is carried out so that a line defect can be repaired. If one repair analog switch is arranged to be connectable to any one of a plurality of analog switches disposed in parallel, any analog switch or any signal line can be repaired by one repair analog switch RAS.

FIG. 6C illustrates a repair method to be used when a short circuit defect occurs in the analog switch AS. Also in this case, the switches SW1, SW2 and SW3 are closed to activate the repair analog switch RAS.

In the case of the short circuit defect, even while the repair switch RAS is off, the analog switch AS connects the signal line VL to the data line PL or control line CL.

In this case, therefore, the input wiring line and the control wiring line to the analog switch AS are opened. As described above, by disabling the hot analog switch AS and activating the repair analog switch RAS, the signal line can be operated normally.

The switches SW1, SW2 and SE3 can be formed by multi-layer wiring layers crossing each other. The wiring line can be disconnected by applying a laser beam thereto.

Figure 7A:
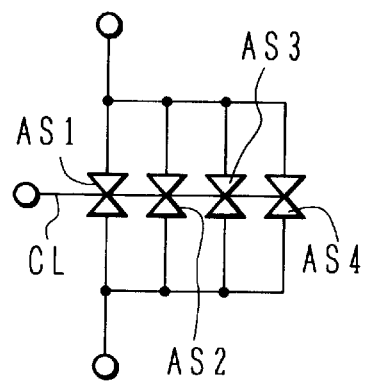
FIGS. 7A to 7D are equivalent circuit diagrams showing the structures of various types of analog switches.

FIGS. 7A to 7D show the structures of analog switches whose electric characteristics can be adjusted. In FIG. 7A, four analog switches AS1 to AS4 are connected in parallel and controlled by the same control line CL. As will be later described, the four analog switches are capable of being sequentially disconnected so that the electrical characteristics thereof can be adjusted.

Figure 7B:
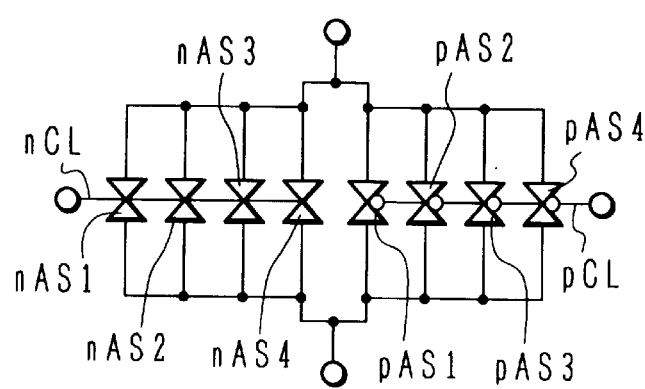

FIG. 7B shows the structure of a CMOS type analog switch. Four n-channel analog switches nAS1 to nAS4 are connected in parallel and controlled by the same control line nCL. Four p-channel analog switches pAS1 to pAS4 are connected in parallel and controlled by the same control line pCL. The n- and p-channel analog switches are connected in parallel.

Figure 7C:
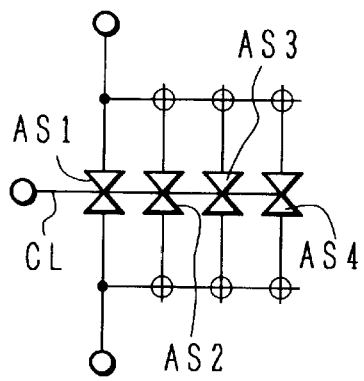

In the structure shown in FIG. 7C, repair analog switches AS2 to AS4 are connected in parallel to an analog switch AS1 which is maintained always connected. The analog switches AS2 to AS4 are disconnected at their input and output wiring lines, and can be connected by applying a laser beam to the laser radiation areas indicated by circles, any time when necessary.

Figure 7D:
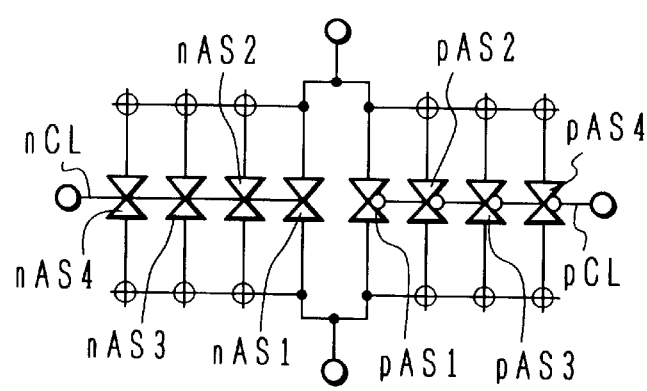

FIG. 7D shows the structure of a CMOS type analog switch having analog switches which are not maintained always connected. Only one n-channel analog switch nAS1 and one p-channel analog switch pAS1 are connected to their input and output wiring lines. In parallel to these analog switches nAS1 and pAS1, repair analog switches nAS1 to nAS4 and pAS2 to pAS4 are formed. By applying a laser beam to the laser radiation areas indicated by circles, lead wires of each repair analog switch can be connected to the input and output wiring lines.

Figure 8A:
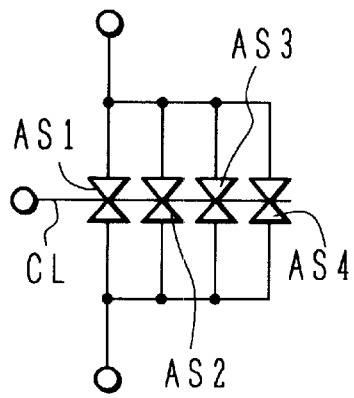
FIGS. 8A to 8E are equivalent circuit diagrams illustrating adjustment methods for the analog switches shown in FIGS. 7A to 7D.
Figure 8B:
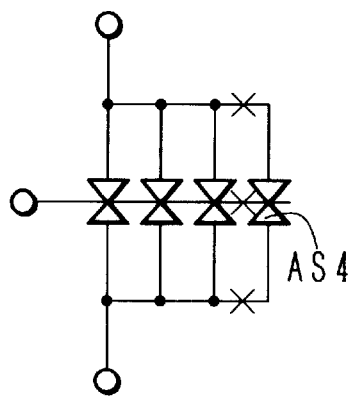
Figure 8C:
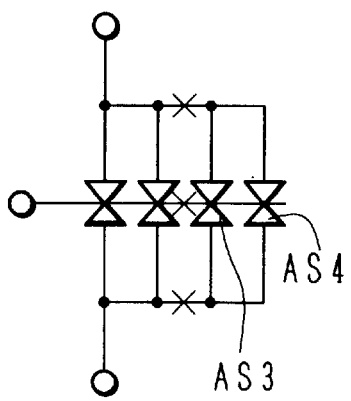

FIGS. 8A to 8E illustrate the adjusting methods for the analog switches shown in FIGS. 7A to 7D. The analog switch shown in FIG. 8A has the equivalent circuit structure as that shown in FIG. 7A. If this analog switch has a higher driving power than other analog switches, one analog switch AS4 is cut off as shown in FIG. 8B or two analog switches AS3 and AS4 are cut off to reduce an effective channel width as shown in FIG. 8C. Similarly, three analog switches AS2 to AS4 may be cut off.

Figure 8D:
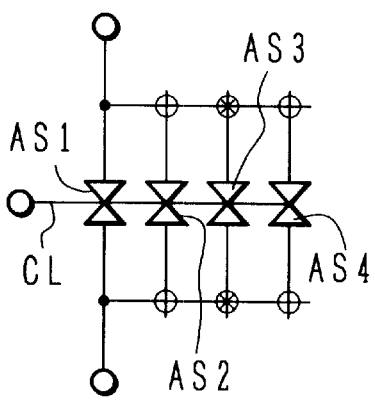

The structure shown in FIG. 8D utilizes the structure as shown in FIG. 7C. In this structure, if a driving power of only one analog switch AS1 is insufficient, an analog switch AS3 is connected in parallel to widen the effective channel width and increase the driving power. The opened wiring lines can be short-circuited through laser radiation. If the driving powers of the repair analog switches AS2 to AS4 are made different, finer adjustment becomes possible by selecting a proper analog switch or switches.

Figure 8E:
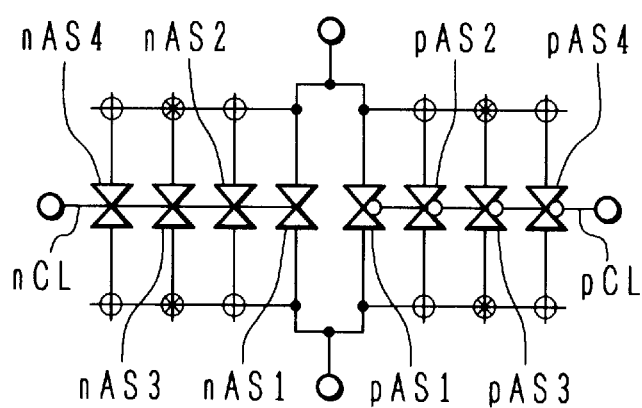

FIG. 8E illustrates the processes of adjusting the characteristics of the CMOS type analog switch shown in FIG. 7D. Also in this case, similar to the case shown in FIG. 8D, a selected proper analog switch is additionally connected to increase the insufficient driving power of the initially connected analog switch.

Circuit defects such as disconnections and short circuits may also occur in the signal line driver circuit, scan line driver circuits and the like, as in analog switches. In order to deal with such cases, it is preferable to form a redundant or duplicate circuit for at least some portion to thereby use it for repair.

Figure 9A:
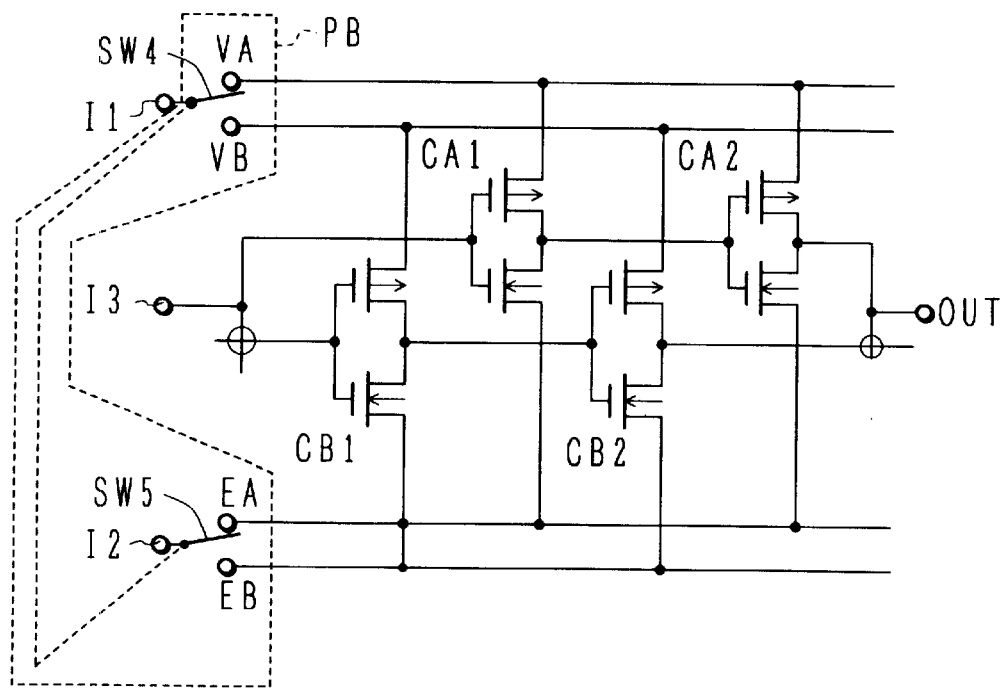
FIGS. 9A and 9B are equivalent circuit diagrams briefly illustrating circuit repair methods.
Figure 9B:
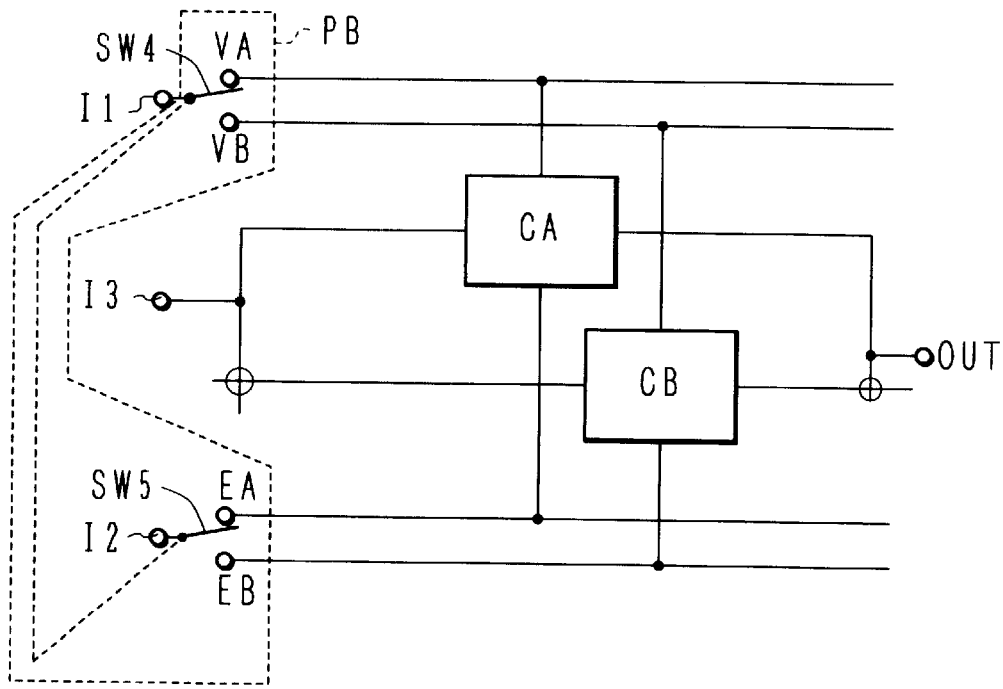

FIGS. 9A and 9B illustrate repair methods for such cases.

Referring to FIG. 9A, inverter circuits CA1 and CA2 are connected between an input terminal 13 and an output terminal OUT, and via switches SW4 and SW5 to power supply terminals 11 and 12. In parallel to the inverter circuits CA1 and CA2, two inverter circuits CB1 and CB2 having an equivalent structure are connected between normally open terminals VB and EB of the switches SW4 and SW5. The gate electrode line of the inverter circuit CB1 at the first stage is disposed crossing the wiring line connected to the input terminal 13 with an insulating film being interposed therebetween, and the output terminal line of the inverter circuit CB2 at the second stage is also disposed crossing the wiring line connected to the output terminal OUT via the insulating film. This cross arrangement of wiring lines is formed on the TFT substrate, and the switches SW4 and SW5 are formed on the printed circuit board PB connected to the TFT substrate.

After a TFT substrate is formed, a substrate test is performed, or after a panel is formed, a panel test is performed. If a defect is found by these tests, the defective inverter circuits are cut off, and the repair inverter circuits are connected. In the structure shown in FIG. 9A, the external switches SW4 and SW5 are turned to the terminals VB and EB sides, and the connection points on the TFT substrate indicated by a circle are short-circuited through laser radiation. With these processes, instead of the two-stage inverter circuits CA1 and CA2, the two-stage inverter circuits CB1 and CB2 are connected between the input terminal 13 and output terminal OUT.

The circuit configuration is not limited only to the two-stage inverter circuit, as obvious to those skilled in the art.

FIG. 9B shows the structure of an optional circuit CA and its repair circuit CB connected in parallel. If any defect is found in the circuit CA, it is replaced by the circuit CB by similar processes to those described with FIG. 9A.

Figure 10:
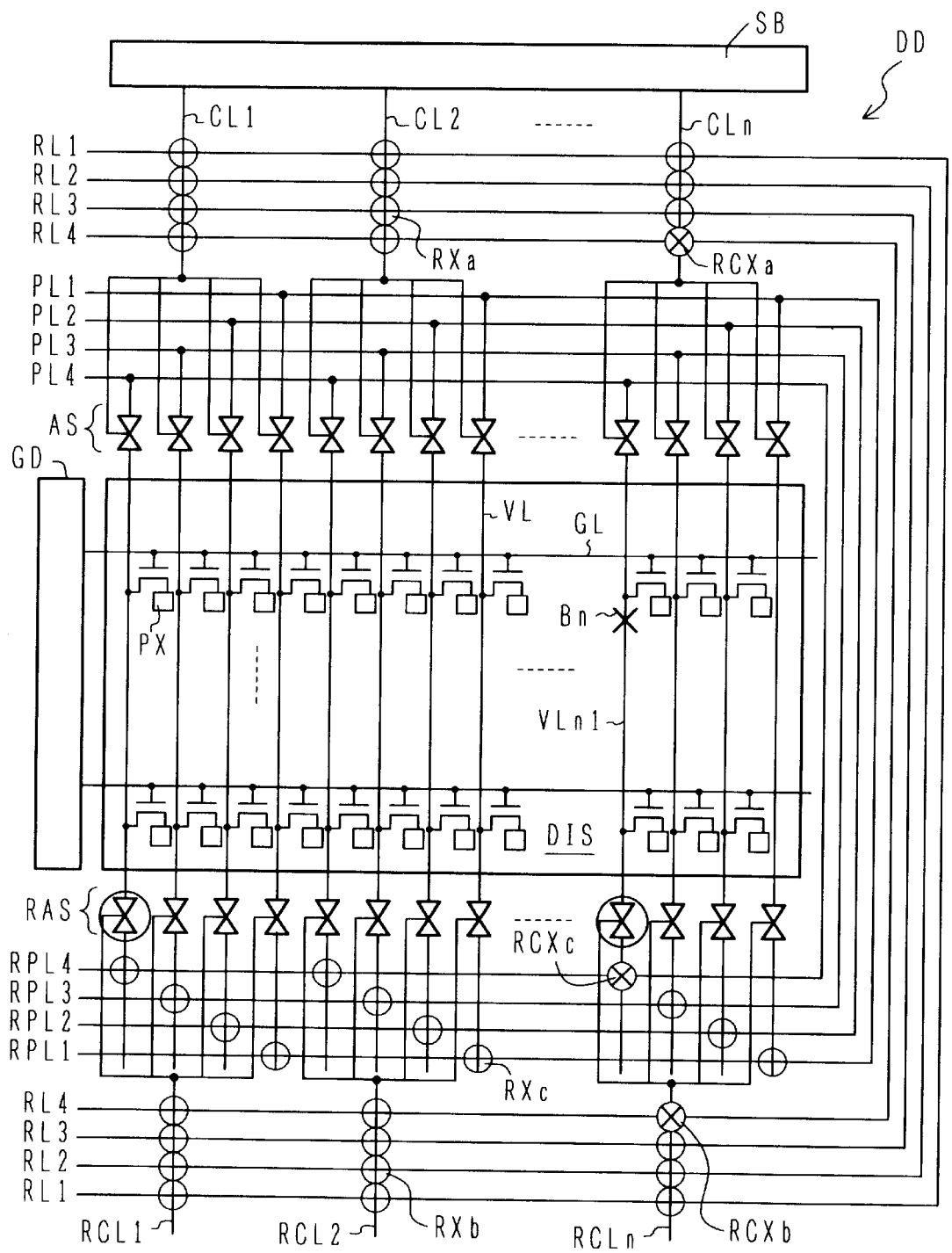
FIG. 10 is a schematic plan view showing the structure of a divided point sequential driving type liquid crystal display device.

FIG. 10 is a circuit diagram of a liquid crystal display device of a divided point sequential driving type. Referring to FIG. 10, a number of pixels PX are disposed in a matrix form in a display area DIS. In order to drive each pixel PX, a plurality of control lines GL extending in the horizontal direction and signal lines VL extending in the vertical direction are provided.

Analog switches AS and RAS are connected to opposite ends of each vertically extending signal line VL. The analog switch RAS connected to the lower end is used for repair, whose input terminal and control terminal are maintained open to disable the analog switch.

In a signal line driver circuit DD, control lines CL, each for four columns per unit, are pulled out in the vertical direction from a shift register—buffer circuit SB. Each control line CL is branched into four lines each being connected to a control terminal of a corresponding analog switch AS. Four analog switches AS in each group are driven at the same time. Four video data lines PL1 to PL4 are connected to input terminals of four analog switches in each group. Each video data line is connected to every fourth input terminal of the analog switches. The video data lines PL1 to PL4 extend around the display area DIS to the lower peripheral area to form repair data lines RPL1 to RPL4 crossing input lines to the repair analog switches RAS which are normally disabled.

Repair lines RL1 to RL4 crossing the control lines CL before they are branched, are disposed around the display area, and cross repair control lines RCL1 to RCLn in the lower peripheral area. Each of the cross repair control lines is connected to the control lines, four lines per unit, of the repair analog switches RAS. Cross points between the repair control lines RL1 to RL4 and the control lines CL1 to CLn and repair control lines RCL1 to RCLn form connection points RXa and RXb to be electrically connected through laser radiation. Cross points between the repair data lines RPL1 to RPL4 and input lines to the repair analog switches RAS form other connection points RXc.

Consider now that one control line VLn1 of the control lines VL is disconnected at an intermediate position Bn. The data signal supplied from the analog switch AS disposed in the upper area in FIG. 10 cannot be transferred to the signal line VLn1 lower than the disconnection point Bn and a line defect is generated.

This line defect can be repaired by activating the repair analog switch RAS connected to the disconnected signal line VLn1 and supplying the data signal from the lower side of the signal line VLn1.

Referring to FIG. 10, if an electrical connection is established at the connection points RCXc, RCXb and RCXa, the control signal on the control line CLn is applied to the control terminal of the repair analog switch RAS via the connection points RCXa and RCXb, and the data signal on the video data line PL4 is applied to the input terminal of the repair analog switch RAS via the connection point RCXc. The data signal can therefore be supplied both from the upper and lower ends of the signal line VLn1 disconnected at the point Bn.

Figure 11:
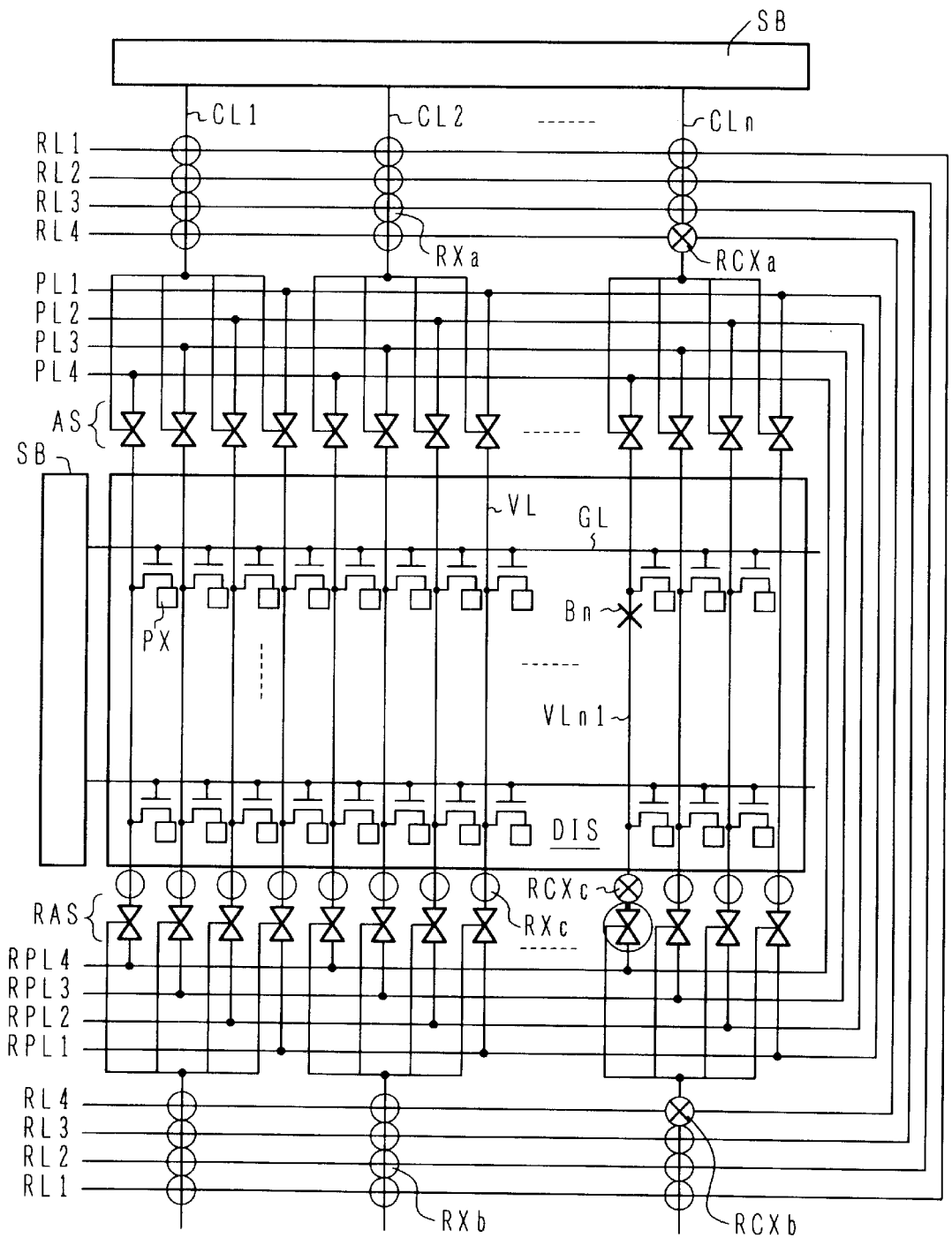
FIG. 11 is a schematic plan view illustrating a method of repairing a defect of the liquid crystal display device shown in FIG. 10.

FIG. 11 shows a modification of the liquid crystal display device of a four-division point sequential driving type shown in FIG. 10. A different point of this device from that shown in FIG. 10 is that the connection point formed on the input terminal side of the repair analog switch RAS is changed to a permanently electrically connected point and that a new connection point RXc is formed at the intermediate of the signal line VL and the repair analog switch RAS. Since the repair analog switch RAS is disconnected from the signal line VL, a load of the analog switch AS is reduced.

Similar to the display device shown in FIG. 10, if one signal line VLn1 is disconnected at a point Bn, an electrical connection is established at the connection points RCXa, RCXb and RCXc so that the corresponding repair analog switch RAS can be activated and the video signal can be supplied also from the lower end of the signal line VLn1. The line defect along the signal line VLn1 lower than the disconnection point Bn can be repaired.

Figure 12:
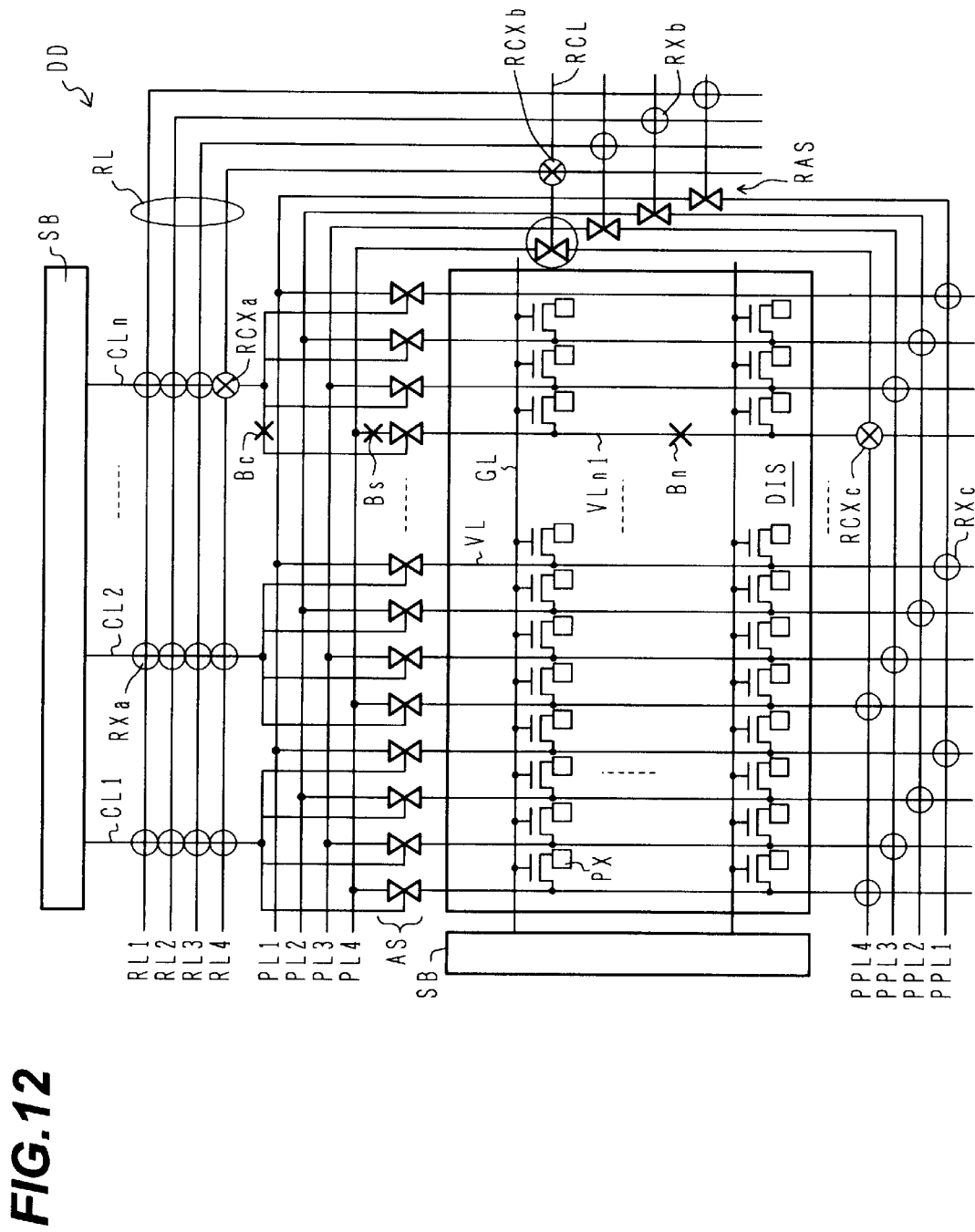
FIG. 12 is a schematic plan view showing a modification of the liquid crystal display device shown in FIG. 10.

FIG. 12 is a circuit diagram showing another example of the structure of a liquid crystal display device of a four-division point sequential driving type. In the structures shown in FIGS. 10 and 11, an analog switch is connected to opposite ends of each signal line. In the structure shown in FIG. 12, the number of repair analog switches is reduced.

Four video data lines PL1 to PL4 are connected to the input lines of normally driven analog switches AS, extend around the display area DIS and form repair data lines RPL1 to RPL4 in the lower peripheral area. These repair data lines RPL1 to RPL4 are connected at their intermediate points with four repair analog switches RAS. The number of repair analog switches RAS is equal to the number of repair data lines. The repair data lines on the output sides of the repair analog switches RAS cross the extensions of the signal lines to form connection points RXc in the lower peripheral area. Four repair lines RL1 to RL4 cross control lines CL1 to CLn before they are branched, to form connection points RXa. The four repair lines RL1 to RL4 extend around the display area DIS, and cross the control lines RCL of the repair analog switches RAS to form connection points RXb. If the signal line VLn1 is disconnected at a point Bn, an electrical connection is established at the connection points RCXa, RCXb, and RCXc to supply the video signal also from the lower end of the disconnected signal line VLn1 to repair the line defect.

If an open-circuit type defect different from the disconnection of a signal line, occurs in the analog switch AS, similar processes are executed to supply the video signal from the lower end of the signal line VL. For example, if the control line or input line of the analog switch is disconnected at a point Bc or Bs, an electrical connection is established at the connection points RCXa, RCXb, and RCXc to supply video data from the lower end of the signal line VL.

Figure 13:
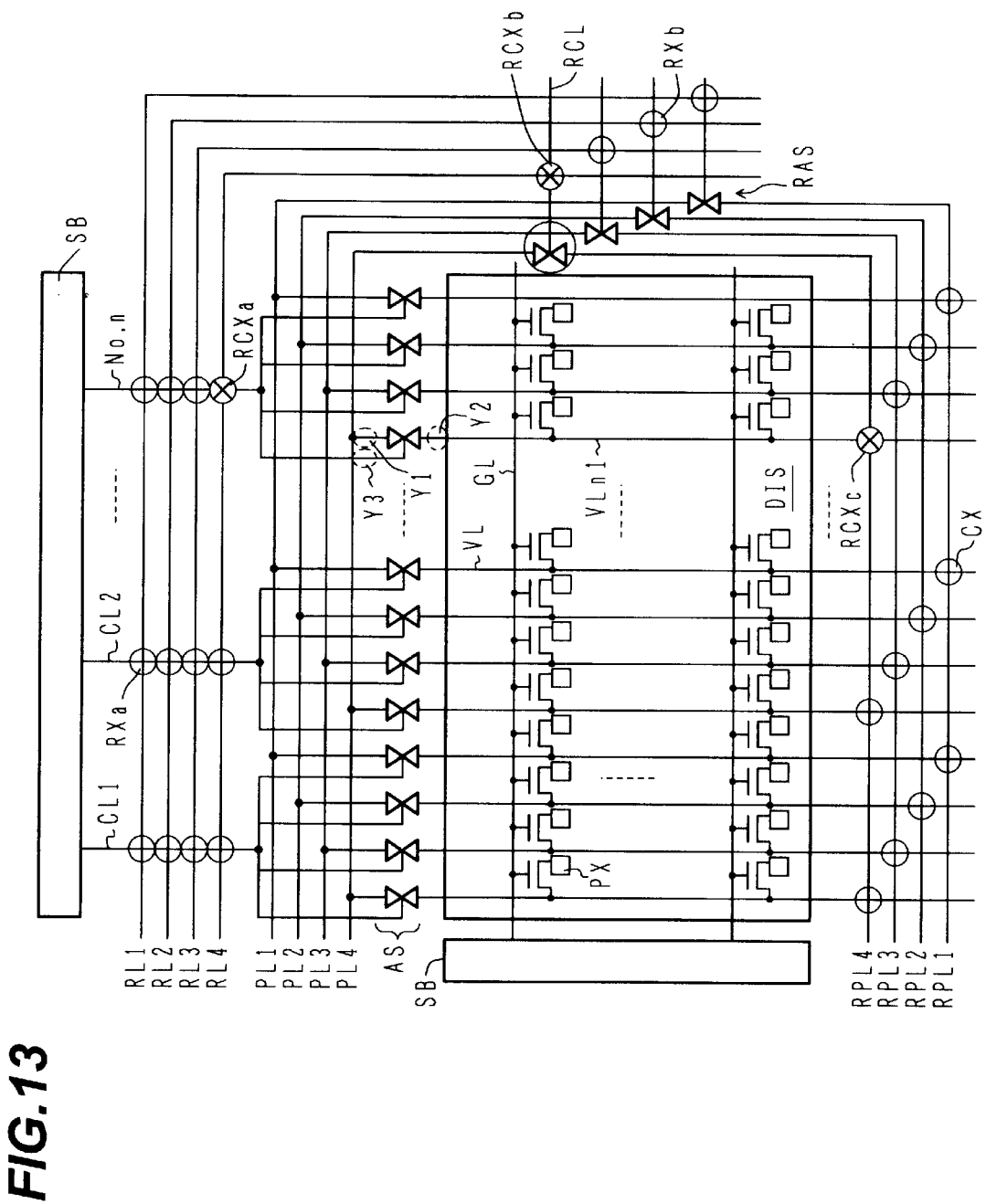
FIG. 13 is a schematic plan view illustrating another method of repairing a defect of the liquid crystal display device shown in FIG. 12.

FIG. 13 illustrates a repair method to be used when the display device having the structure shown in FIG. 12 has a short-circuit type defect in an analog switch. When a short-circuit type defect occurs in the analog switch ASn, the input line, output line and control line of the analog switch ASn are electrically disconnected by applying a laser beam to disconnection points Y1, Y2 and Y3 to electrically separate the analog switch ASn from the signal line. The defective analog switch ASn can therefore be isolated completely from the circuit. Connection of a repair analog switch is performed in the similar manner to the above-described embodiment.

Figure 14:
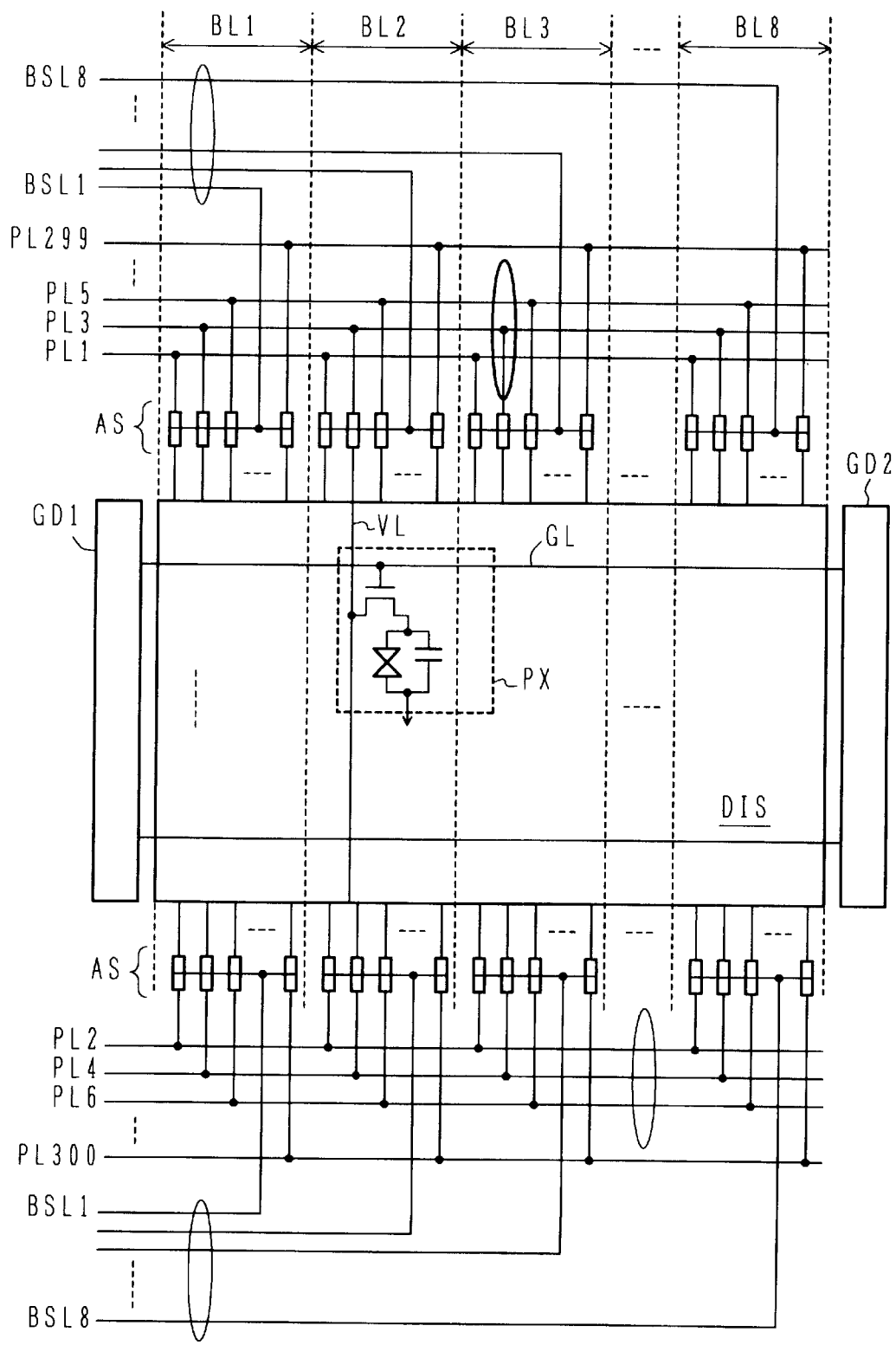
FIG. 14 is a schematic plan view showing the structure of a block sequential driving type liquid crystal display device.

FIG. 14 is a circuit diagram showing the structure of a liquid crystal display device of a block selection sequential driving type. This structure will be described by taking as an example the structure of a polysilicon liquid crystal panel with an integrated 8-4 type peripheral circuit. For example, in the display area DIS, 2400 signal lines VL and 600 scan lines GL are disposed in the vertical and horizontal directions and a pixel PX is connected at each cross point. 2400 signal lines are divided into eight blocks BL1 to BL8. Namely, one block BL has 300 signal lines. These 300 signal lines are classified into odd and even number signal lines. A driver circuit for odd number signal lines is disposed in the upper area of FIG. 14, and a driver circuit for even number signal lines is disposed in the lower area. Block selection signal lines BSL1 to BSL8 supply a signal for selecting one of the eight blocks. This block selection signal is supplied to all control lines of the analog switches AS of each block.

A video data signal is supplied by 150 odd video data lines PL1 to PL299 disposed in the area above the display area DIS, and by 150 even number video data lines P1 to PL300 disposed in the area under the display area DIS. In each connection area between the odd number video data lines PL and corresponding odd number signal lines VL disposed in the upper area, an analog switch AS is disposed. Similarly, an analog switch AS is disposed in each connection area between the 150 even number video data lines PL2 to PL300 and corresponding even number signal lines VL disposed in the lower area.

Each scan line GL is connected to scan line driver circuits GD1 and GD2 shown in the right and left areas in FIG. 14 and receives the same signal from opposite sides. A repair circuit is not shown in FIG. 14.

Figure 15:
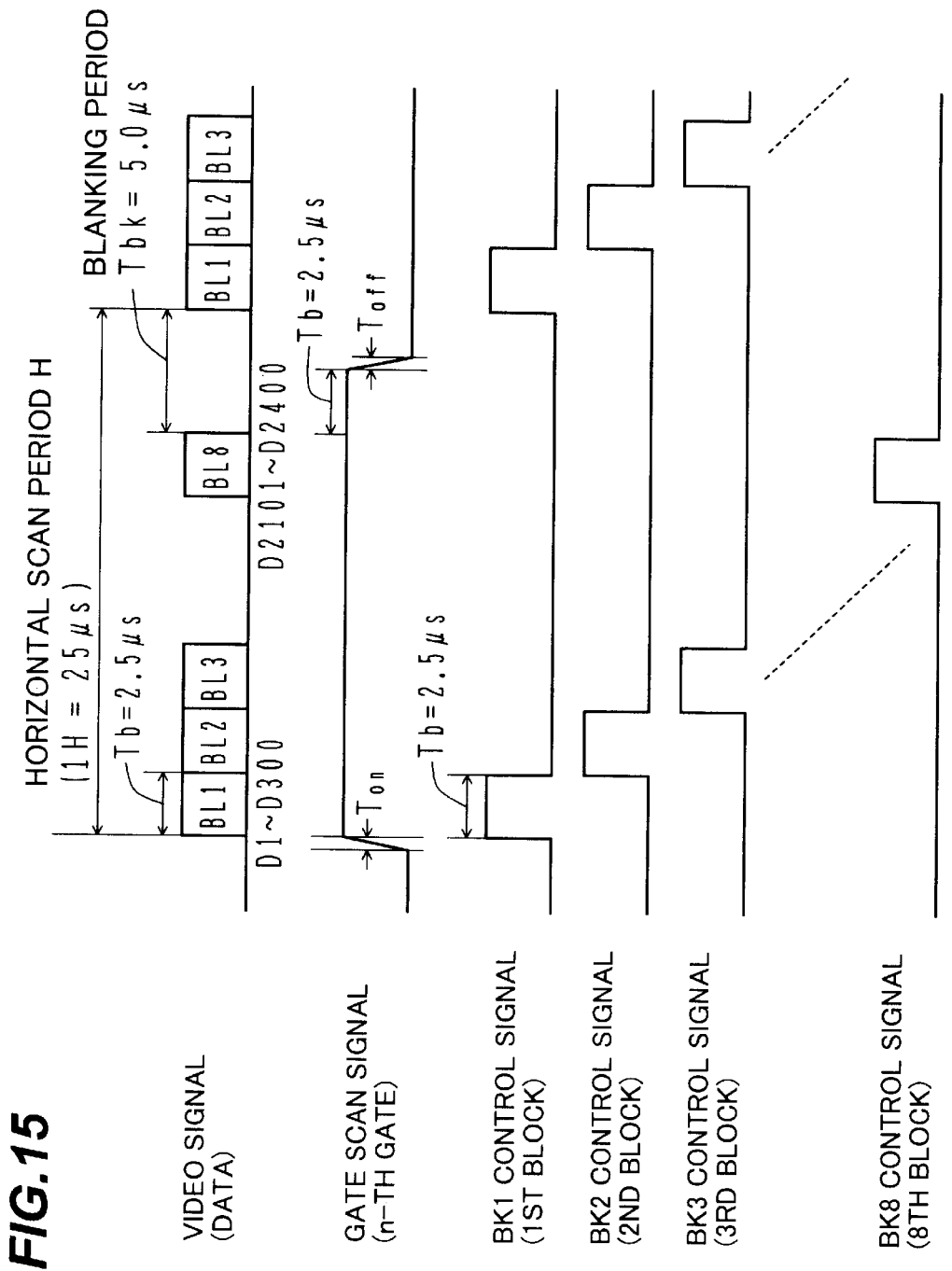
FIG. 15 is a timing chart illustrating a driving method for the liquid crystal display device shown in FIG. 14.

FIG. 15 is a timing chart of control signals of a block selection sequential driving type shown in FIG. 14. One horizontal scan period H is 25 $\mu$s and corresponds to the time while one scan line is selected. During one horizontal scan period H, eight block selection times Tb are allocated. During the first block selection time, the block BL1 is selected. During the next block selection time, the second block BL2 is selected. After the eighth block BL8 is selected, a blanking period Tbk=5.0 $\mu$s is set. During each block selection time, video signals are supplied from 300 video data lines PL1 to PL299 and PL2 to PL300.

In the structure shown in FIG. 14, driver circuits are disposed in the upper and lower peripheral areas along the longer sides of the display area DIS and in the right and left peripheral areas along the shorter sides. Therefore, an area for the repair circuit is limited.

Figure 16:
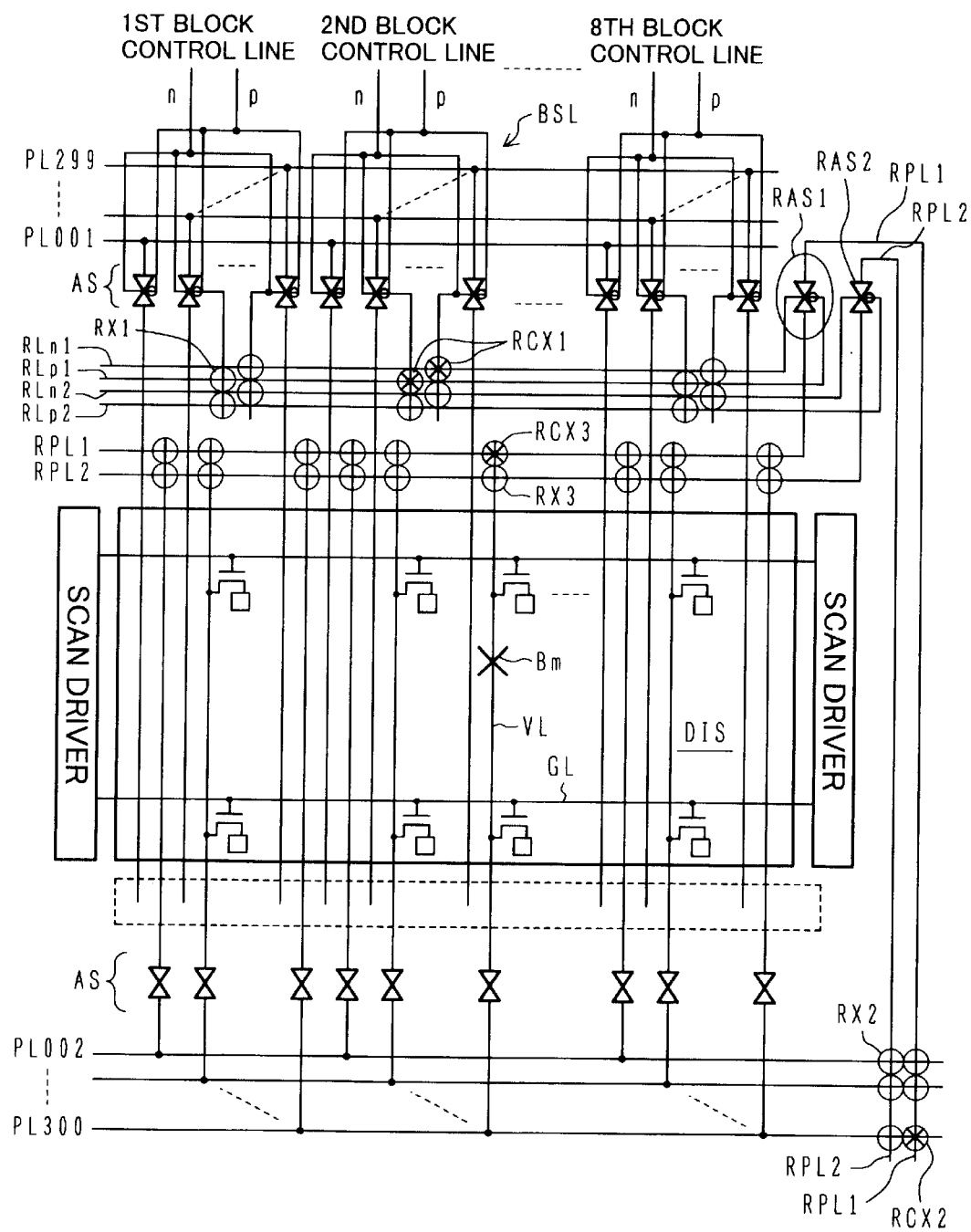
FIG. 16 is a schematic plan view showing the structure of the liquid crystal display device shown in FIG. 14 provided with defect repair wiring components.

FIG. 16 shows the structure of the display device shown in FIG. 14 and added with a repair circuit and wiring lines. For the simplicity of the drawing, a repair circuit connected to the even number video data lines PL2 to PL300 disposed in the lower area is shown, and another repair circuit for the odd number video data lines PL1 to PL299 is not shown. The structures of both the repair circuits are equivalent.

An analog switch AS has a CMOS structure and requires n- and p-channel block selection signals. The n- and p-channel block selection signals are collectively represented by BSL. The block selection signal lines for the even number signal lines are not shown.

An output terminal of an analog switch AS disposed in the upper area extends downward and is connected to an odd number signal line. The even number signal line extends downward and is connected to the output terminal of another analog switch AS, and also extends upward to form connection areas for connection points. Two repair signal lines RPL1 and RPL2 are disposed in the horizontal direction to cross the upper extended even number signal lines to form connection points RX3. The repair signal lines RPL1 and PRL2 are connected to the output terminals of two repair analog switches RAS1 and RAS2 juxtaposed with the odd number analog switches AS. The input terminals of the repair analog switches RAS1 and RAS2 are connected to repair data lines RPL1 and RPL2 extending in the vertical direction in FIG. 16 which cross even number data lines PL2 to PL300 in the lower peripheral area to form connection points RX2.

The block selection signal lines BSL extend downward to form connection areas for connection points. Repair control lines RLn1, RLp1, RLn2 and RLp2 are disposed in the horizontal direction, crossing the block selection signal lines to form connection points RX1. There are two connection points RX2 for p- and n-channel transistors of the CMOS analog switch.

If a signal line VL is disconnected, video data cannot be transferred to the signal line below the disconnection point.

It is assumed that an even number signal line VL is disconnected. The signal from the analog switch AS disposed in the lower peripheral area cannot be transferred to the signal line VL above the disconnection point Bn. This disconnected signal line can be repaired by using the repair analog switch RAS1.

An electrical connection is established at the connection point RCX3 at the cross point between the repair data line RPL1 connected to the output terminal of the repair analog switch RAS1 and the disconnected signal line VL. Also, an electrical connection is established at the connection point RCX2 at the cross point between the data line PL300 corresponding to the disconnected signal line VL and the repair data line PRL1 connected to the input terminal of the repair analog switch RAS1. Also, an electrical connection is established at the connection point RCX1 at the cross point between the corresponding block selection signal line BSL and the repair control lines RLn1 and RLp1 connected to the control terminals of the repair analog switch RAS1.

With these repair processes, a signal on the data line PL300 can be supplied from the upper end of the signal line VL via the connection point RCX2, repair data line RPL1, and repair analog switch RAS1, and via the repair data line RPL1 and connection point RCX3 in the upper peripheral area.

In this embodiment, two repair analog switches are used for the even number signal lines. The number of repair analog switches and associated wiring lines can be increased or decreased as desired. A similar repair structure is provided also for the odd signal lines.

Figure 17A:
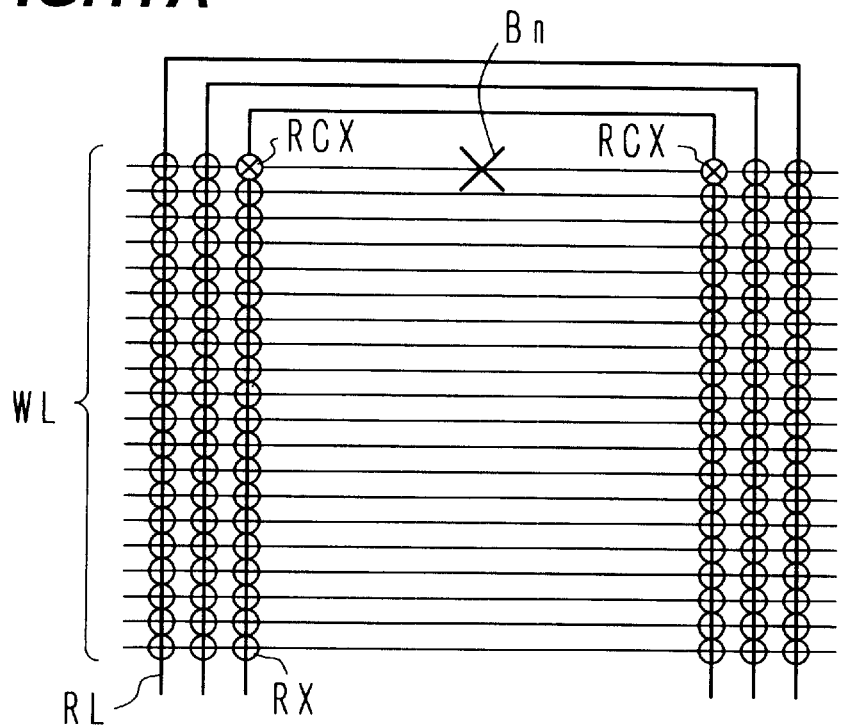
FIGS. 17A and 17B are schematic plan views illustrating repair methods for a plurality of wiring lines disposed in parallel.
Figure 17B:
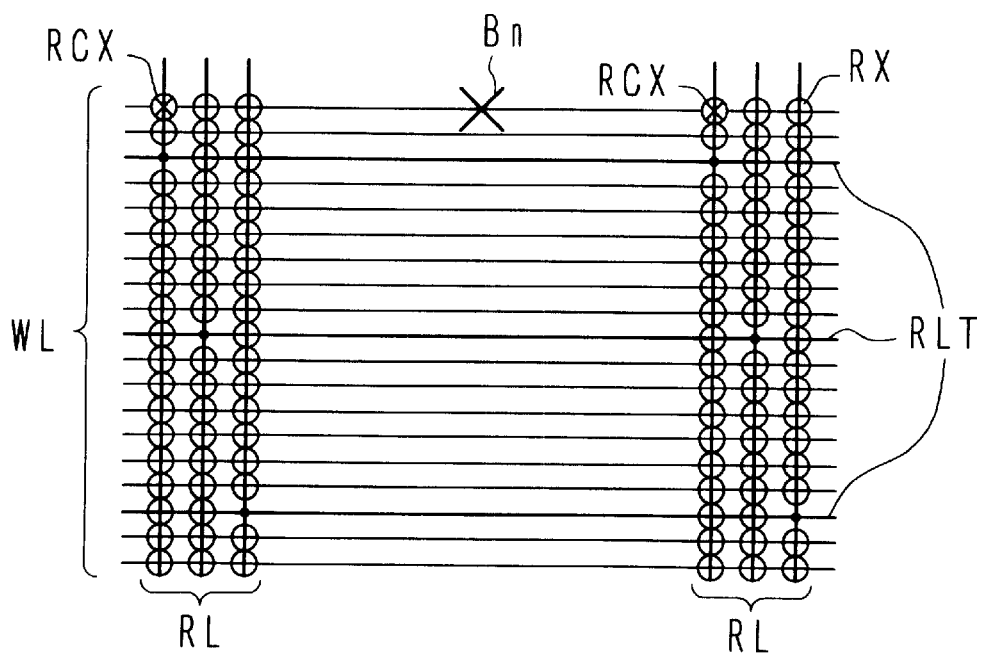

FIGS. 17A and 17B illustrate a repair method for a disconnection of a plurality of wiring lines disposed in parallel.

In FIG. 17A, a number of wiring lines WL are disposed in parallel in the horizontal direction. A repair method for a disconnected wiring line will be described. Repair wiring lines RL cross the wiring line group WL near opposite ends thereof, and are connected together in the upper area in FIG. 17A to form each continuous repair wiring line. Each cross point between the wiring line group WL and repair wiring lines RL forms a connection point RX. If the uppermost wiring line WL is disconnected, an electrical connection is established at two connection points RXC between one repair wiring line RL and the disconnected wiring line WL to electrically connect the right and left portions of the wiring line WL disconnected at an intermediate point Bn.

In the structure shown in FIG. 17A, although each continuous repair wiring line RL has a channel-shaped pattern, other patterns may also be used with similar advantages.

FIG. 17B shows another structure of repair wiring lines. Repair wiring lines RLT are mixed in a number of wiring lines WL disposed in the horizontal direction. A plurality of repair wiring lines RL are also disposed in the vertical direction near opposite ends of the wiring line group WL. Each cross point between the horizontal wiring lines WL and vertical repair wiring lines forms a connection point RX. Each pair of vertical repair wiring lines is electrically connected to a predetermined one of the horizontal repair wiring line RLT.

In the structure shown in FIG. 17B, if the uppermost wiring line WL is disconnected at a point Bn, an electrical connection is established at two connection points RCX. The right and left portions of the wiring line disconnected at the disconnection point Bn are electrically connected via the connection points RCX, to a pair of vertical repair wiring lines RL and the corresponding horizontal repair wiring line RLT. In this manner, the disconnection of wiring lines disposed in parallel can be repaired.

As in the structure shown in FIG. 16, the scan line driver circuit GD is provided on both sides of the display area DIS. If each scan line is driven from both sides, a line defect will not occur even if a scan line is disconnected. In this case, however, since the two scan line driver circuits are always driven, a power consumption increases. Repair wiring lines such as shown in FIGS. 17A and 17B can be used when the scan line is to be driven from one side.

Figure 18:
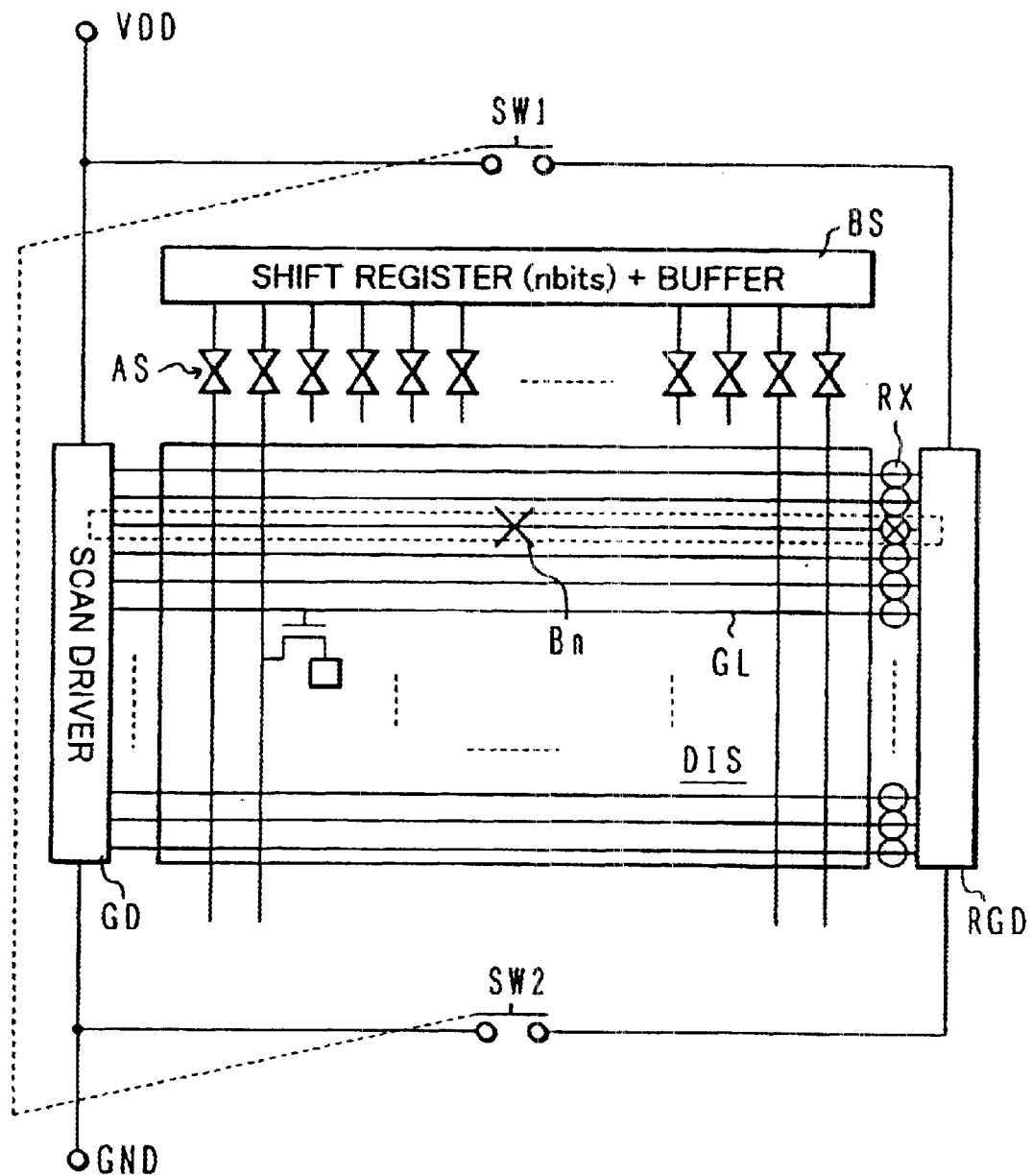
FIGS. 18 is a schematic plan view of a liquid crystal display device provided with a scan line repair driver circuit.

FIG. 18 shows the structure of a liquid crystal display device in which although the scan line driver circuit is provided on both sides of the display area, each scan line is normally driven from one side and a line disconnection can be repaired. In the display area DIS, a plurality of scan lines GL are disposed in the horizontal direction. Each scan line is driven by the scan line driver circuit GD disposed on the left side of the display area DIS.

A repair scan line driver circuit RGD is disposed on the right side of the display area DIS, and provides a connection point RX for each scan line. When an electrical connection is established at the connection point RX, the repair scan driver RGD is connected to the corresponding scan line GL. A repair scan line RGD is connected via switches SW1 and SW2 to power supply terminals VDD and GND. The switches SW1 and SW2 are mounted on a printed circuit board different from the TFT substrate.

When a scan line GL is disconnected at a point Bn, the switches SW1 and SW2 are closed in response to an external control signal to activate the repair scan line driver circuit RGD, and an electrical connection is established at the connection point RX corresponding to the disconnected scan line GL.

With such a repair, the scan line disconnected at the disconnection point Bn can be driven by the scan line driver circuits GD and RGD on both the right and left sides and the line defect can be repaired.

Although the above description pertains to a disconnection of a scan line GL, any disconnection in the shift register or buffer circuit in the scan line driver circuit GD can be repaired in a similar manner.

Figure 19A:
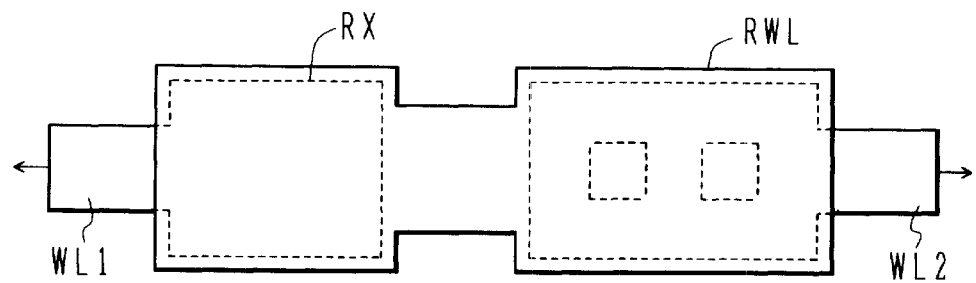
FIGS. 19A and 19B are a plan view and a cross sectional view showing the structure of a connection point at which a laser beam is applied.
Figure 19B:
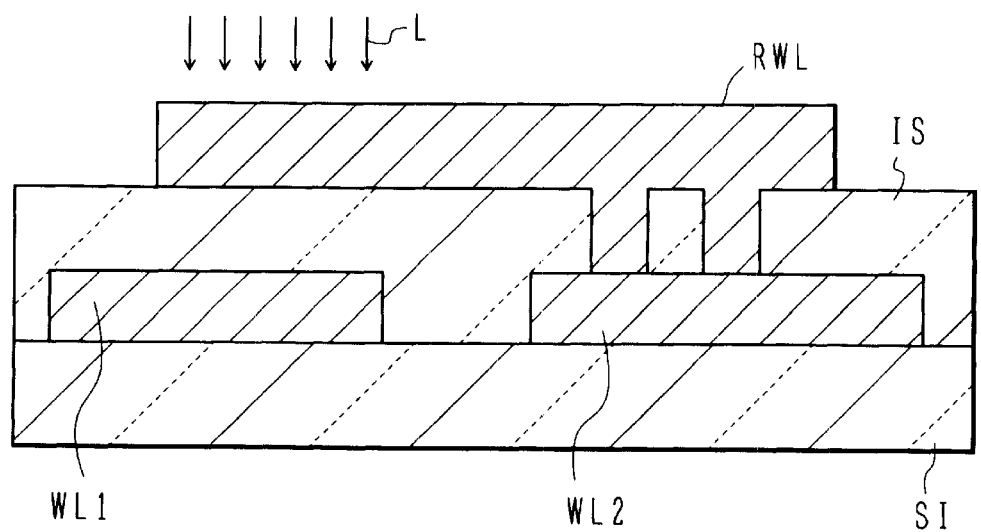

The structure of a connection point will be described. FIGS. 19A and 19B are a plan view and a cross sectional view showing the general structure of a connection point. A pair of wiring lines WL1 and WL2 is disposed on a substrate, facing each other without electrical connection. An insulating layer IS is formed on the substrate S1, covering the wiring lines WL1 and WL2. A repair wiring line RWL is connected to the wiring line WL2 via a contact hole, and forms a connection point RX over the other wiring line WL1. A laser beam L is applied to this connection point RX. The repair wiring line RWL absorbs the laser light L and is heated so that the insulating layer IS is destructed and the repair wiring line RWL is electrically connected to the underlying wiring line WL1.

In the structure shown in FIGS. 19A and 19B, the laser radiation conditions for connecting a pair of wiring lines provide only a narrow margin. In order to reliably obtain an electrical connection through laser radiation, the following structure may be used.

Figure 20A:
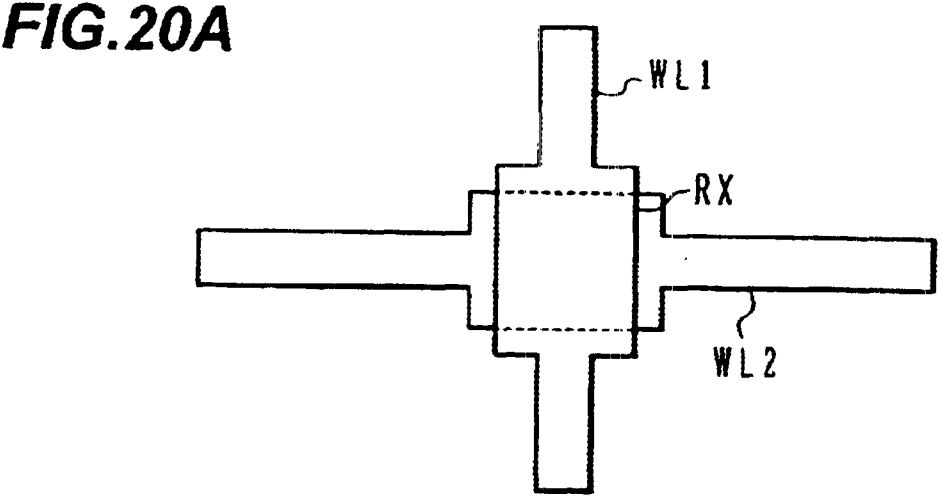
FIGS. 20A to 20C are plan views and a cross sectional view briefly showing the structure of laser beam bonding points.
Figure 20B:
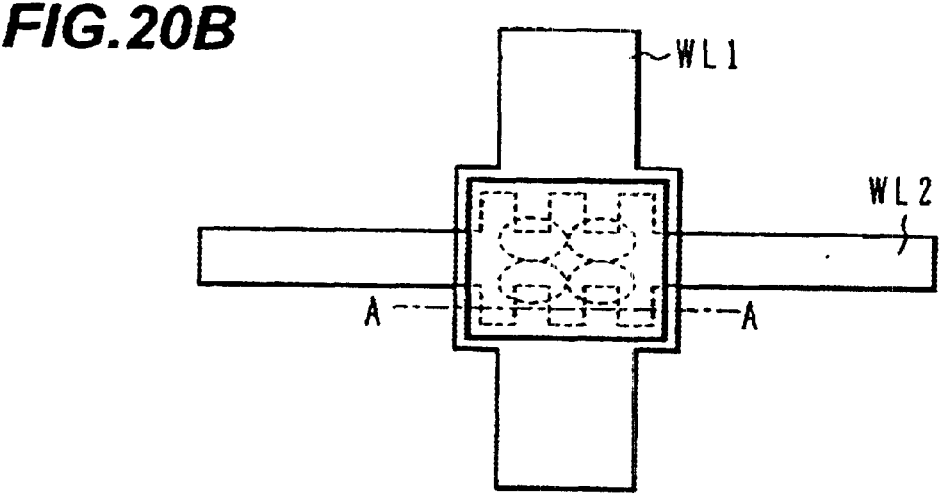
Figure 20C:
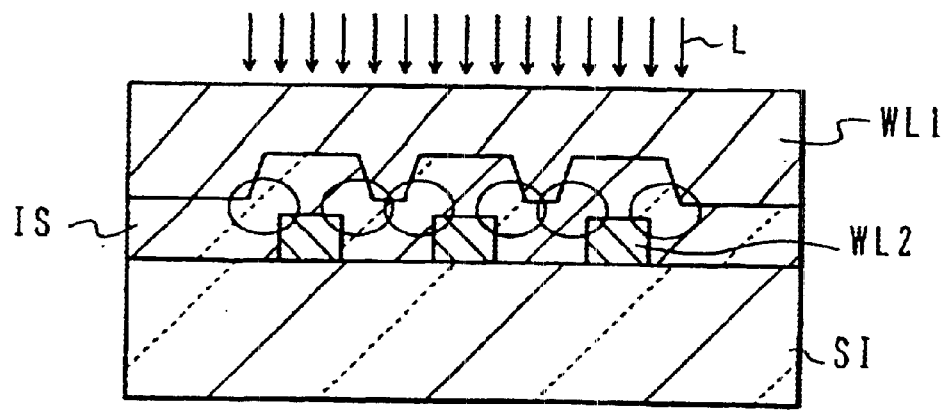

FIGS. 20A to 20C show the structures of a connection point easy to establish an electrical connection. FIG. 20A shows one structure, and FIGS. 20B and 20C show another structure.

In FIG. 20A, a vertically extending wiring line WL1 and a horizontally extending wiring line WL2 form a cross area. In this cross area, a connection point RX is formed. Each wiring line is formed wider at the connection point. With this structure, when the connection point RX is heated, the heat to be transmitted to the narrower wiring lines WL2 and WL3 is restricted. Therefore, heating the connection point is easy and a reliable electrical connection can be obtained.

In FIG. 20B, a lower wiring line WL2 has comb-shaped portions extending from both sides thereof at the connection point. An upper wiring line WL1 is disposed on this wiring line WL2 via an insulating layer IS. The insulating layer IS has the surface conforming to the shape of the lower wiring line WL2. The insulating layer IS becomes relatively thin at the shoulder of the lower wiring line WL2. The shoulder of the lower wiring line WI is disposed facing the downward projection of the upper wiring layer WL1. Therefore, the upper and lower wiring lines WL1 and WL2 are disposed facing each other with a relatively short gap therebetween and heat can be easily concentrated in this area. The insulating film IS can therefore be easily destructed and the upper and lower wiring lines WL1 and WL2 can be easily connected.

Figure 21A:
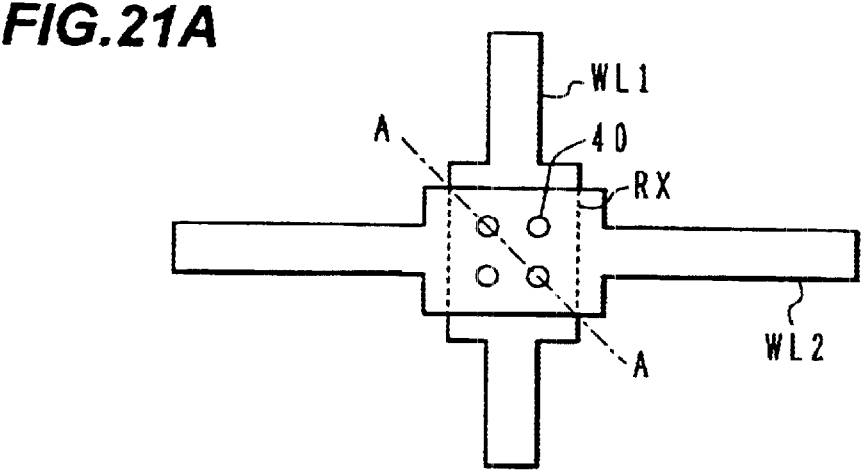
FIGS. 21A to 21D are a plan view and cross sectional views briefly showing the structure of another connection point at which a laser beam is applied.
Figure 21B:
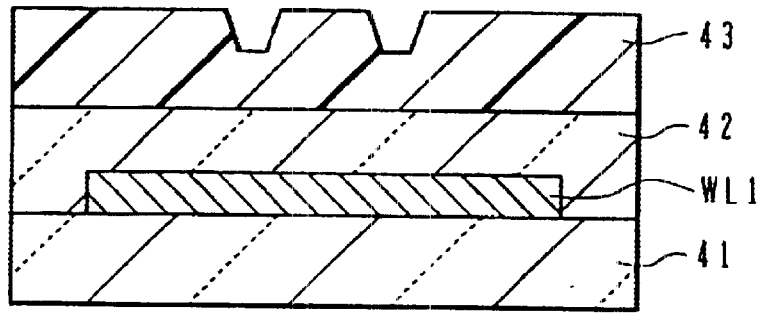
Figure 21C:
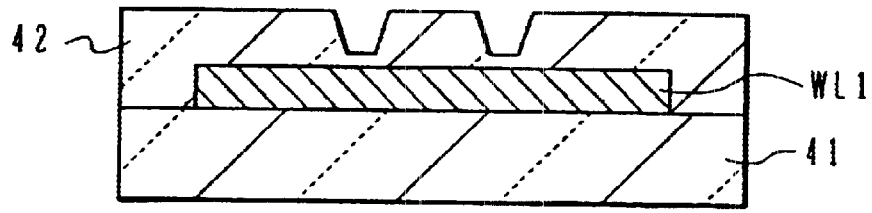
Figure 21D:
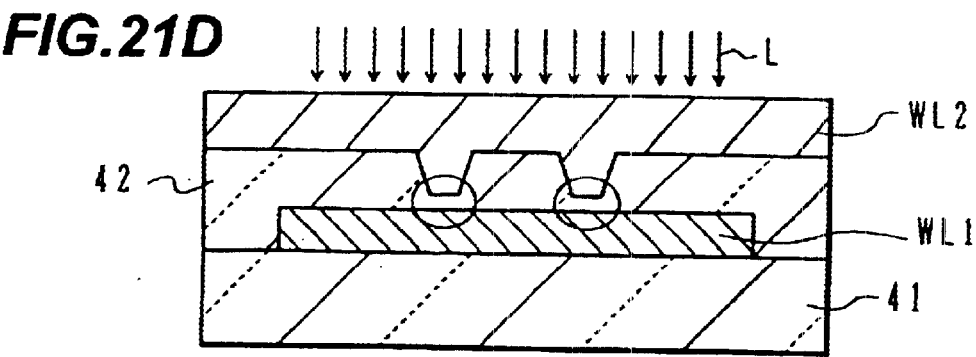

FIGS. 21A to 21D show the structure of a connection point which can be formed by using three masks. FIG. 21A is a plan view, and FIGS. 21B to 21D are cross sectional views illustrating the processes of forming the connection point.

As shown in FIG. 21A, a lower wring line WL1 and an upper wiring line WL2 are disposed crossing each other. Between the lower and upper wiring lines WL1 and WL2, an insulating film with recesses 40 is interposed. Because of the recesses 40 of the insulating film, when the connection point RX at the cross point between the wiring lines is heated, the insulating film is destructed mainly under the recesses 40 and the upper and lower wiring lines can be short-circuited easily.

FIGS. 21B to 21D illustrate the method of forming such an insulating film with recesses.

As shown in FIG. 21B, the lower wiring line WL1 is formed on a substrate 41. For patterning of the wiring line WL1, a first mask is used. An insulating layer 42 made of, for example, $SiN_x$, is formed covering the lower wiring line WL1. On this insulating layer 42, a resist mask 43 with recesses such as shown in FIG. 21B is formed. For example, such a resist mask can be formed through exposure of a pattern having a diameter smaller than the design rule. If the design rule is 3μm, a hole having a diameter of 2μm is exposed. A hole having a diameter smaller than the design rule cannot be exposed perfectly, but it is exposed as a half hole (or recess).

By using the resist mask 43, the insulating film 42 is anisotropically etched through reactive ion etching using $CF_4/O_2$, for example. The resist mask in the thinner portion is consumed at an earlier stage so that the underlying insulating film 42 is etched.

FIG. 21C shows the shape of the insulating film after the etching. The insulating film 42 has recesses corresponding to the recesses of the resist mask 43. Thereafter, the upper wiring line WL2 is formed on the insulating film 42 and patterned.

FIG. 21D is a schematic cross sectional view showing the stacked-layer wiring structure formed by the above processes. Since the insulating film 42 has the recesses, the upper wiring line WL2 has projections toward the lower wiring line WL1 in the areas of the recesses. As a laser beam L is applied downward to the wiring line WL2, the wiring line WL2 is heated and the insulating film 42 can be easily destructed in the areas of the recesses. The upper and lower wiring lines can be short-circuited easily.

For example, the lower wiring line WL1 is made of Al-Nd alloy, the upper wiring line is made of a lamination of an 80 nm thick Ti film, a 50 nm thick Al film and a 150 nm thick Ti film, and the interlayer insulating film 42 is made of an $SiN_x$ film having a thickness of 500 nm.

Although the surface of the upper wiring line is shown planarized in FIGS. 20C and 21D, the actual surface is irregular in conformity with the lower irregular surface. Such an irregular surface is expected to increase an absorption efficiency of an incidence laser beam.

Figure 22A:
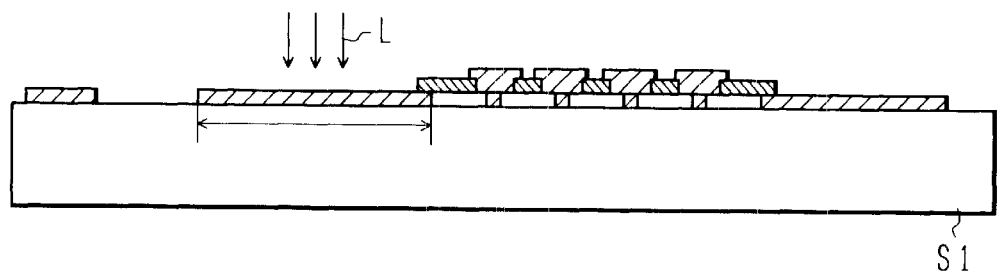
FIGS. 22A to 22C are cross sectional views and a plan view illustrating a repair process using a laser beam.
Figure 22B:
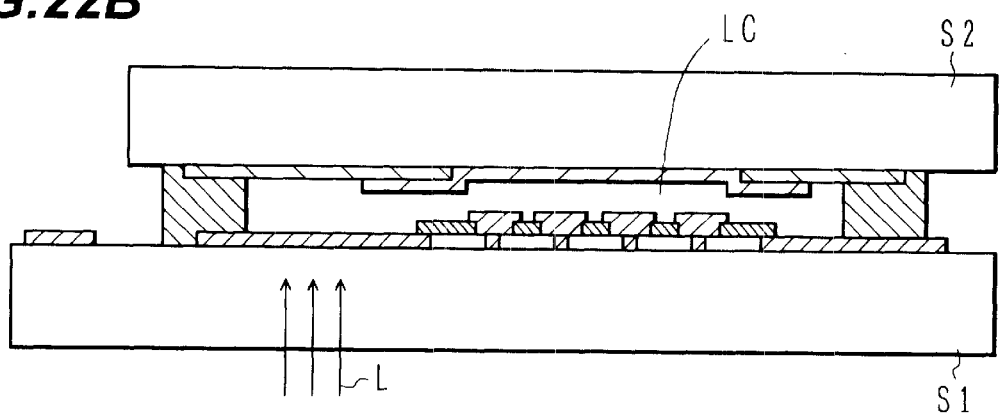
Figure 22C:
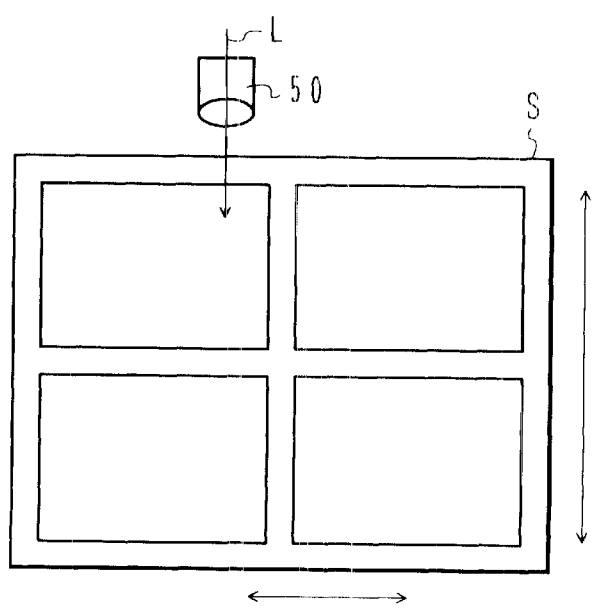

FIGS. 22A to 22C are schematic diagrams illustrating repair processes of a liquid crystal display device manufacture method.

FIG. 22A illustrates a repair process wherein a laser beam L is radiated if a defect is found during the inspection of circuits formed on a TFT substrate S1. The TFT substrate S1 is still not mounted on the common substrate so that the laser beam L can be radiated directly to the upper surface of the TFT substrate S1.

FIG. 22B illustrates a repair process after a liquid crystal display panel is formed. After the TFT substrate S1 and common substrate S2 are manufactured, these substrates are bonded together with a predetermined space therebetween to assemble a liquid crystal panel. After the substrates are bonded together, the internal circuits are inspected and if a defect is found, the repair process is executed. This inspection and repair process may be performed either before or after liquid crystal material is injected.

Since the opposing or common substrate is bonded to the TFT substrate, a repair process is executed by applying a laser beam from the bottom of the TFT substrate. The repair conditions are required to be set so as not to damage the common substrate S2.

If a display performance is to be checked, it is necessary to perform this check after liquid crystal material is injected. If liquid crystal material is injected into the space between the substrates, the repair conditions are required to be set so as not to generate bubbles or the like in the liquid crystal layer.

FIG. 22C schematically illustrates a laser repair process. A laser beam L is radiated downward from an optical system 50. A glass substrate S has four TFT substrates formed thereon. The glass substrate S is placed on a table which is two-dimensionally moved and the laser beam L is radiated from the upper position to repair a defect.

The present invention has been described in connection with the preferred embodiments. The invention is not limited only to the above embodiments. It will be apparent to those skilled in the art that various modifications, improvements, combinations, and the like can be made.

What is claimed is:

1. A liquid crystal display device, comprising:

a first substrate having an insulating surface;

a display unit disposed in a central area of said first substrate and including a plurality of pixels disposed in a matrix shape, a plurality of scan lines for activating pixels disposed in a row direction, and a plurality of signal lines each for transferring video data to an activated pixel among pixels disposed in a column direction;

a scan line driver circuit formed in a first row direction side area of a peripheral area of said first substrate outside of said display unit, said scan line driver circuit generating a signal for driving the scan lines;

a signal line driver circuit formed in a first column direction side area of the peripheral area of said first substrate, said signal line driver circuit generating a signal for driving the signal lines; and a repair circuit formed in a partial area of the peripheral area of said first substrate, said repair circuit having substantially a same structure as a portion of said scan line driver circuit and said signal line driver circuit.

2. A liquid crystal display device according to claim 1, wherein:

said signal line driver circuit includes a plurality of data lines for transferring the video data and a plurality of analog switches same in number as the number of signal lines, each analog switch having an input terminal, an output terminal and a control terminal, the input terminal being connected to one end of a corresponding one of the data lines, and the output terminal being connected to one end of a corresponding one of the signal lines; and said repair circuit includes at least one reserved analog switch having an equivalent structure to the analog switch, an input terminal of the reserved analog switch being connectable to one of the data lines and an output terminal thereof being connectable to the other end of one of the signal lines.

3. A liquid crystal display device according to claim 2, wherein said repair circuit is located in a second column direction side area of the peripheral area opposing the first column direction side area, and includes reserved analog switches same in number to the number of analog switches.

4. A liquid crystal display device according to claim 3, wherein said repair circuit includes a plurality of data repair lines continuously extending from the plurality of data lines and being connectable to corresponding input terminals of the reserved analog switches, and the output terminal of each reserved analog switch is connected to a corresponding one of the signal lines.

5. A liquid crystal display device according to claim 3, wherein said repair circuit includes a plurality of data repair lines continuously extending from the plurality of data lines and being connected to corresponding input terminals of the reserved analog switches, and the output terminal of each reserved analog switch is connectable to a corresponding one of the signal lines.

6. A liquid crystal display device according to claim 2, wherein the signal lines include extensions extending on a column direction side area of the peripheral area, said repair circuit includes data repair lines each connected to each of the plurality data lines and crossing each of the extensions of the signal lines, and the input and output terminals of the reserved analog switch are connected to the data repair lines at intermediate positions thereof.

7. A liquid crystal display device according to claim 6, wherein said signal line driver circuit includes a plurality of control lines connected to the control terminals of the analog switches, and said repair circuit includes first control repair lines crossing the plurality of control lines and second control repair lines connected to the reserved analog switches and crossing the first control repair lines.

8. A liquid crystal display device according to claim 2, further comprising another signal line driver circuit formed in a second column side area of the peripheral area opposing the first column side area and having an equivalent structure to said signal line driver circuit, and said repair circuit includes reserved analog switches smaller in number than the number of analog switches and juxtaposed with the analog switches in the first and second column direction side areas.

9. A liquid crystal display device according to claim 8, wherein said signal line driver circuit includes block control lines for supplying a control signal to the analog switches corresponding to each block containing a predetermined number of signal lines, and said repair circuit includes control repair lines crossing the block control lines and connected to the reserved analog switches.

10. A liquid crystal display device according to claim 9, wherein said repair circuit includes data repair lines crossing extensions of the signal lines and connected to the output terminals of the reserved analog switches.

11. A liquid crystal display device according to claim 1, further comprising another scan line driver circuit formed in a second row side area of the peripheral area opposing the first row side area and having an equivalent structure to said scan line driver circuit, and each of the scan lines is connectable to said other scan line driver circuit in the second row side area.

12. A liquid crystal display device according to claim 1, wherein said scan line driver circuit and said signal line driver circuit include wiring lines; said repair circuit includes a repair line disposed in a predetermined area in superposition with a hot lines which is one of the wiring lines, the scan lines, and the signal lines further comprising insulating films for electrically insulating the repair line from the hot line in the predetermined area.

13. A liquid crystal display device according to claim 12, wherein the hot line or the repair line is wider in the predetermined area than in other area.

14. A liquid crystal display device according to claim 12, wherein the hot line or the repair line has a branched plan shape in the predetermined area.

15. A liquid crystal display device according to claim 12, wherein the hot line or the repair line has an irregular surface opposing to the repair line or the hot line.

16. A liquid crystal display device according to claim 12, wherein the insulating film has a thinned portion in the predetermined area.

17. A liquid crystal display device according to claim 12, wherein the hot line and the repair line have line segments juxtaposed in the peripheral area of said first substrate.

18. A liquid crystal display device according to claim 17, further comprising another substrate different from said first substrate, and said repair circuit includes an electronic component having a switching function disposed on said other substrate.

* * * * *